United States Patent
Krishnamurthy et al.

(10) Patent No.: US 9,401,749 B2
(45) Date of Patent: Jul. 26, 2016

(54) METHOD FOR CODEBOOK ENHANCEMENT FOR MULTI-USER MULTIPLE-INPUT MULTIPLE-OUTPUT SYSTEMS

(71) Applicant: Google Technology Holdings LLC, Mountain View, CA (US)

(72) Inventors: Sandeep H. Krishnamurthy, Mountain View, CA (US); Tyler A. Brown, Mundelein, IL (US); Colin D. Frank, Park Ridge, IL (US); Robert T. Love, Barrington, IL (US); Vijay Nangia, Algonquin, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 127 days.

(21) Appl. No.: 14/140,812

(22) Filed: Dec. 26, 2013

(65) Prior Publication Data
US 2014/0254508 A1 Sep. 11, 2014

Related U.S. Application Data

(60) Provisional application No. 61/775,333, filed on Mar. 8, 2013.

(51) Int. Cl.
*H04B 7/04* (2006.01)
*H04L 5/00* (2006.01)
*H04B 7/06* (2006.01)

(52) U.S. Cl.
CPC ............ *H04B 7/0417* (2013.01); *H04B 7/0452* (2013.01); *H04B 7/0456* (2013.01); *H04B 7/0634* (2013.01); *H04B 7/0639* (2013.01); *H04L 5/005* (2013.01); *H04B 7/065* (2013.01)

(58) Field of Classification Search
CPC ...................................................... H04B 7/0417
USPC ........................................................ 370/329
See application file for complete search history.

(56) References Cited

U.S. PATENT DOCUMENTS 7,629,902 B2 12/2009 Zhang et al.
7,659,831 B2 2/2010 Lin et al.
(Continued)

FOREIGN PATENT DOCUMENTS

| EP | 1174732 A2 | 1/2002 |
| GB | 2479377 A | 10/2011 |
| WO | WO 2012/063104 A1 | 5/2012 |

OTHER PUBLICATIONS

Intel Corporation: "On downlink MIMO enhancement", 3GPP TSG-RAN WG1 #72, St. Julian's, Malta, Jan. 28-Feb. 1, 2013, all pages.
(Continued)

*Primary Examiner* — Melvin Marcelo
*Assistant Examiner* — Peter Solinsky
(74) *Attorney, Agent, or Firm* — Faegre Baker Daniels LLP

(57) ABSTRACT

A wireless terminal is capable of receiving a pilot signal from a base station; and determining a precoding matrix as a linear combination of two matrices $V_1$ and $V_2$ based on the received pilot signal. In one implementation, the two matrices $V_1$ and $V_2$ are sub-matrices of a matrix U of a codebook, the linear combination is $u:=(V_1+\alpha V_2)/\sqrt{1+|\alpha|^2}$ and $\alpha$ is one of a real-valued number and a complex-valued number. The wireless terminal is also capable of transmitting a representation of at least a portion of the precoding matrix to the base station.

20 Claims, 9 Drawing Sheets

(56) References Cited

U.S. PATENT DOCUMENTS

| | | |
|---|---|---|
| 8,179,775 B2 | 5/2012 | Chen et al. |
| 8,204,151 B2 | 6/2012 | Kim et al. |
| 8,229,012 B2 | 7/2012 | Khojastepour |
| 8,306,146 B2 | 11/2012 | Heath, Jr. et al. |
| 8,314,654 B2 | 11/2012 | Outaleb et al. |
| 8,325,839 B2 | 12/2012 | Rensburg et al. |
| 8,326,839 B2 | 12/2012 | Idicula et al. |
| 8,331,464 B2 | 12/2012 | Lee et al. |
| 8,331,489 B2 | 12/2012 | Clerckx et al. |
| 8,340,961 B2 | 12/2012 | Lin et al. |
| 8,346,193 B2 | 1/2013 | Khojastepour et al. |
| 2003/0236099 A1 | 12/2003 | Deisher et al. |
| 2010/0172430 A1* | 7/2010 | Melzer et al. ............... 375/267 |
| 2011/0274003 A1* | 11/2011 | Pare et al. .................. 370/252 |
| 2012/0087401 A1* | 4/2012 | Bhattad et al. ............. 375/224 |
| 2012/0202555 A1* | 8/2012 | Bergman et al. ........... 455/522 |
| 2013/0010880 A1 | 1/2013 | Koivisto et al. |
| 2013/0028344 A1 | 1/2013 | Chen et al. |
| 2013/0308714 A1* | 11/2013 | Xu et al. .................... 375/267 |
| 2015/0155923 A1* | 6/2015 | Tong et al. ................. 370/329 |

OTHER PUBLICATIONS

International Search Report and Written Opinion issued by the European Patent Office dated Apr. 9, 2014, for related International Application No. PCT/US2014/014759; 12 pages.

\* cited by examiner

METHOD FOR CODEBOOK ENHANCEMENT FOR MULTI-USER MULTIPLE-INPUT MULTIPLE-OUTPUT SYSTEMS

CROSS-REFERENCE TO RELATED APPLICATIONS

The present application claims priority to U.S. Provisional Patent Application 61/775,333, filed Mar. 8, 2013, the entirety of which is incorporated herein by reference.

TECHNICAL FIELD

The present disclosure is directed to a method and apparatus for channel feedback in a wireless system with antenna arrays. More particularly, the present disclosure is directed to feedback from a wireless terminal to a base station.

BACKGROUND

A Multi-Input Multi-Output (MIMO) communication system uses a plurality of channels in a spatial area. Antenna arrays that have multiple transmission antennas can increase the capacity of data transmission through MIMO transmission schemes.

Two types of MIMO transmission schemes can be employed. Single-user MIMO (SU-MIMO) involves transmitting at least one data stream to a single user over a time frequency resource. Multi-user MIMO (MU-MIMO) involves transmitting at least one data stream per user to at least two co-scheduled users over a single, i.e., same time frequency, resource.

In a MIMO communication system, base stations and mobile stations use codebooks to enable channel state information feedback. The codebooks may additionally be used for precoding the information streams at the transmitter. Elements of a codebook are stored in both base stations and in mobile stations, and can be used to quantize the spatial channel state information for feedback. Each codebook element is a vector or a matrix, depending on the dimension of the channel matrix and the number of data streams supported. When communicating with a base station, the mobile station receives a Channel State Information Reference Signal (CSI-RS) from the base station and, using the CSI-RS, determines the state of the channel (generally referred to as Channel State Information (CSI)) between it and the base station and, based on the channel state, selects a vector or a matrix from the codebook. The mobile station then "recommends" the selected vector or matrix to the base station as part of overall CSI feedback. The base station may then use the recommended vector for beamforming or, more generally, the recommended matrix for precoding data streams prior to transmission via multiple antennas. Precoding is a technique that is used to weight multiple data streams transmitted from an antenna array in order to maximize the throughput of the link.

Typically, MIMO systems support a maximum of eight CSI-RS ports. However, some base station antenna arrays may employ more than eight antenna elements, which exceeds the number of CSI-RS antenna ports available. Furthermore, large antenna arrays may require additional CSI, including precoding vector or matrix recommendations, from connected mobile stations.

DRAWINGS

While the appended claims set forth the features of the present techniques with particularity, these techniques may be best understood from the following detailed description taken in conjunction with the accompanying drawings of which:

DESCRIPTION

Figure 1:
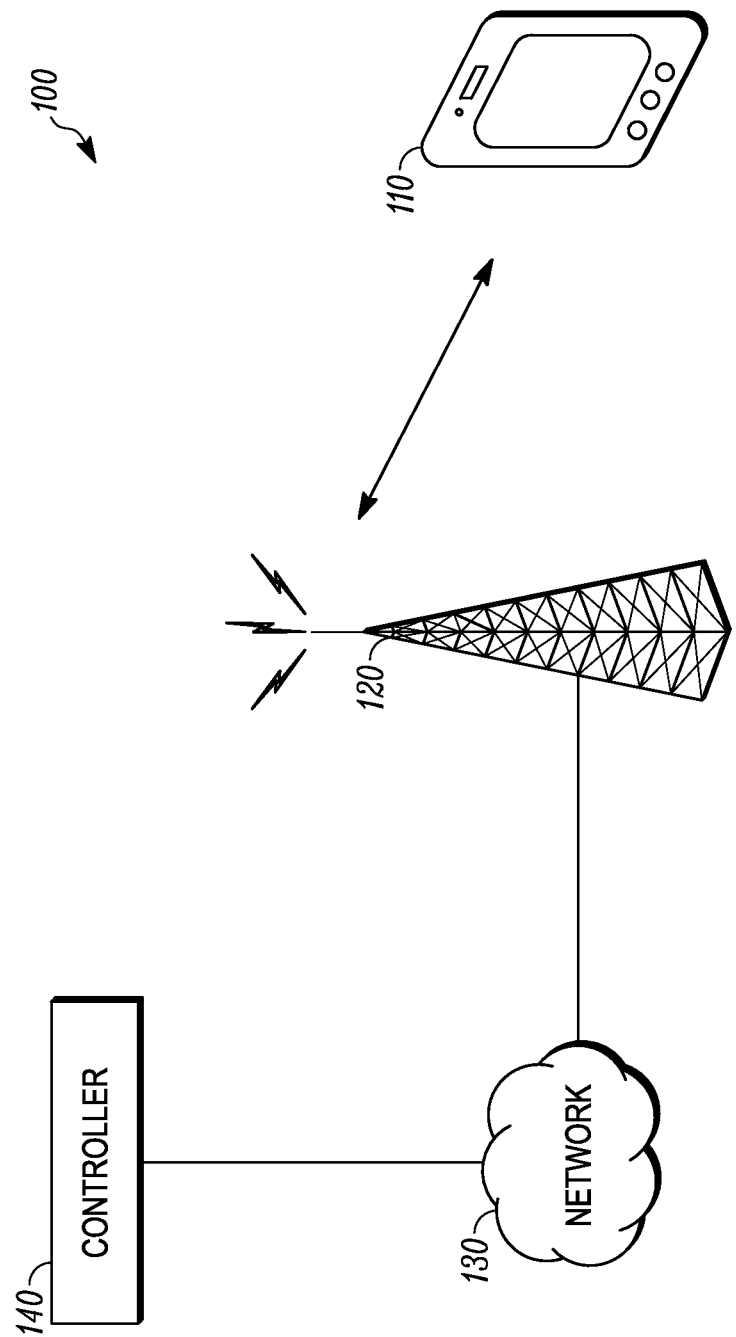
FIG. 1 is a block diagram of a system in which various embodiments may be employed.

FIG. 1 is a block diagram of a system 100 according to an embodiment. The system 100 can include a User Equipment (UE) 110, a base station such as an enhanced Node B ("eNB") 120, a network 130, and a network controller 140. The UE 110 may be a wireless terminal. For example, the UE 110 can be a wireless communication device, a wireless telephone, a cellular telephone, a personal digital assistant, a pager, a personal computer, a selective call receiver, a tablet computer, or any other device that is provided with the capability of sending and receiving communication signals on a network such as a wireless network. Other possible embodiments of the UE 110 include a camera, an automotive product, a household product, a television, and a radio. Possible embodiments of the eNB 120 include a cellular base station, an access point (AP), access terminal (AT), relay node, home eNB, pico eNB, femto eNB, Transmission Point (TP), or other device that provides access between a wireless communication device and a network. The UE 110 and the eNB 120 communicate with one another using one or more well-known communication techniques, such as radio-frequency cellular signals.

The network 130 may be any type of network that is capable of sending and receiving signals, such as wireless signals. For example, the network 130 may be a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, or a satellite communications network. Furthermore, the network 130 may include more than one network, including multiple types of networks. For example, the network 130 may include multiple data networks, multiple telecommunications networks, or a combination of data and telecommunications networks. The network controller 140 is connected to the network 130. The network controller 140 may be located at a base station, at a radio network controller, or anywhere else on the network 130.

Figure 2:
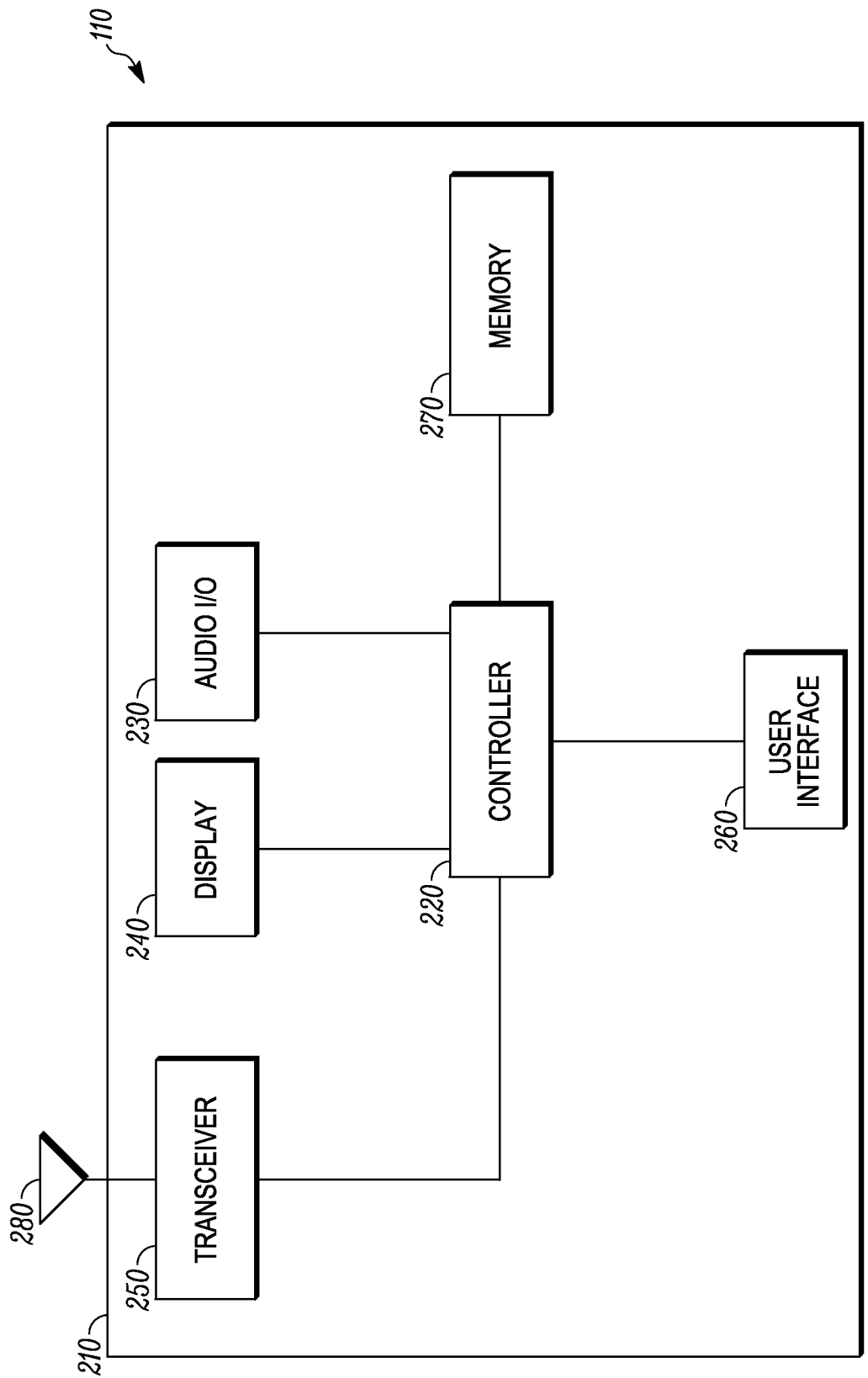
FIG. 2 is a block diagram of a UE according to an embodiment.

FIG. 2 is an example block diagram of the UE 110 according to an embodiment. The UE 110 can include a housing 210, a controller 220 coupled to the housing 210, audio input and output circuitry 230 coupled to the housing 210, a display 240 coupled to the housing 210, a transceiver 250 coupled to the housing 210, a user interface 260 coupled to the housing 210, a memory 270 coupled to the housing 210, and multiple antennas 280 coupled to the housing 210 and the transceiver 250.

The display 240 can be a liquid crystal display (LCD), a light emitting diode (LED) display, a plasma display, a projection display, a touch screen, or any other device for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch pad, a joystick, a touch screen display, another additional display, or any other device useful for providing an interface between a user and an electronic device. The memory 270 can include a random access memory, a read only memory, an optical memory, a subscriber identity module memory, or any other memory that can be coupled to a wireless communication device. The UE 110 can perform the methods described in all the embodiments. The transceiver 250 creates a data connection with the eNB 120 (FIG. 1). The controller 210 may be any programmable processor.

Figure 3:
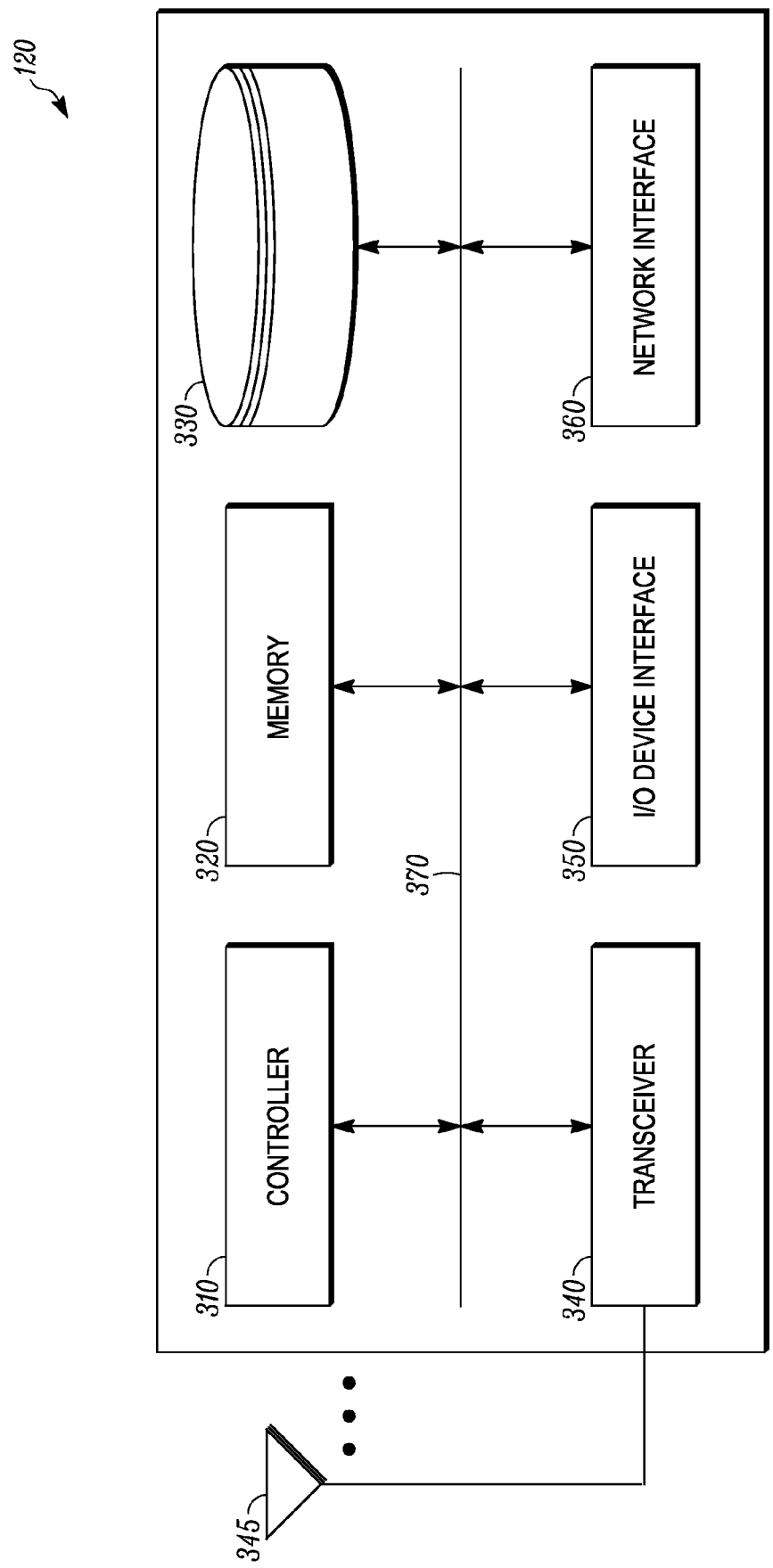
FIG. 3 is a block diagram of an eNB according to an embodiment.

FIG. 3 is a block diagram of the eNB 120 (FIG. 1), according to an embodiment. The eNB 120 includes a controller 310, a memory 320, a database interface 330, a transceiver 340, antenna array 345, Input/Output (I/O) device interface 350, a network interface 360, and a bus 370. The eNB 120 may implement any operating system, such as Microsoft Windows®, UNIX, or LINUX, for example.

The transceiver 340 creates a data connection with the UE 110 (FIG. 1). The controller 310 may be any programmable processor. The embodiments disclosed herein may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 310 may be any controller or processor device or devices capable of operating a base station and implementing the disclosed embodiments.

According to a possible implementation, the memory 320 includes volatile and nonvolatile data storage. Examples include electrical, magnetic, or optical memories, Random Access Memory (RAM), cache, and hard drives. Data may be stored in the memory 320 or in a separate database. For example, the database interface 330 may be used by the controller 310 to access the database. The database may contain any formatting data to connect the UE 110 to the network 130.

According to a possible implementation, the I/O device interface 350 is connected to one or more input and output devices that may include a keyboard, a mouse, a touch screen, a monitor, a microphone, a voice-recognition device, a speaker, a printer, a disk drive, or any other device or combination of devices that accept input and/or provide output. The I/O device interface 350 may receive a data task or connection criteria from a network administrator. The network interface 360 may be connected to a communication device, modem, network interface card, a transceiver, or any other device capable of transmitting and receiving signals to and from the network 130. The components of the eNB 120 are connected via the bus 270, are linked wirelessly, or are otherwise connected.

Figure 4:
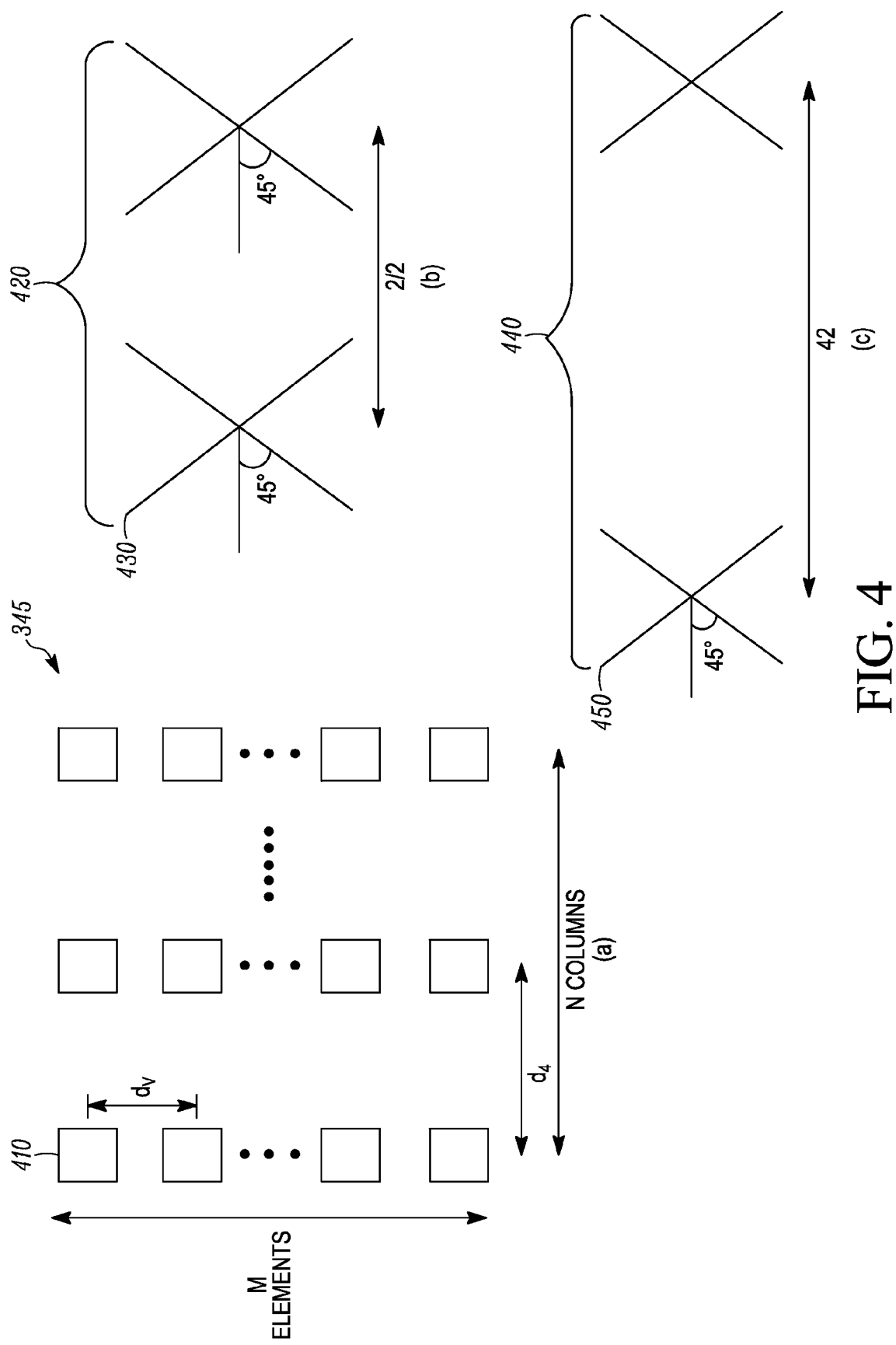
FIG. 4 is a block diagram of antenna arrays at a base station according to possible embodiments.

FIG. 4 is a block diagram of the antenna array 345 (FIG. 2) according to an embodiment. In this embodiment, the antenna array 345 is a transmit (Tx) antenna grid of M×N antennas 410, and includes M dipoles and N (N>1) columns of M dipole elements arranged as N columns of M elements each. Antennas other than dipoles may also be used. Alternatively, the antenna array 345 can include (M/2) cross-pole antenna pairs arranged as N columns of (M/2) cross-pole antenna pairs. Vertical inter-element separation is denoted by $d_V$, where $d_V \in \{0.5\lambda, 4\lambda\}$ and horizontal inter-element separation is denoted by $d_V$, where $d_V \in \{0.5\lambda, 4\lambda\}$, and where $\lambda$ is the wavelength applicable to the center frequency of the LTE carrier or carrier frequency of the transmitted signal. In an alternative embodiment, the antenna array 345 is a closely-spaced 4 Tx antenna array having two pairs of cross-polarized antennas 430 separated by $0.5\lambda$. In a further embodiment, antenna array 345 is a widely-spaced 4 Tx antenna array having two pairs of cross-polarized antennas 450 separated by $4\lambda$.

The eNB 120 (FIG. 1) can estimate an Angle of Departure (AoD) of a Tx signal and/or a UE 110 coarse location with respect to the antenna array 345 (FIG. 2) based on an uplink Sounding Reference Signal (SRS) transmission or more generally, any uplink transmissions from the UE 110 (FIG. 1), by leveraging uplink channel response reciprocity (in Time Division Duplex (TDD) systems) or multipath direction of arrival reciprocity (in Frequency Division Duplex (FDD)) systems). The antenna array 345 can be calibrated with respect to AoD, which allows beamsteering in the direction of the UE 110.

Figure 5:
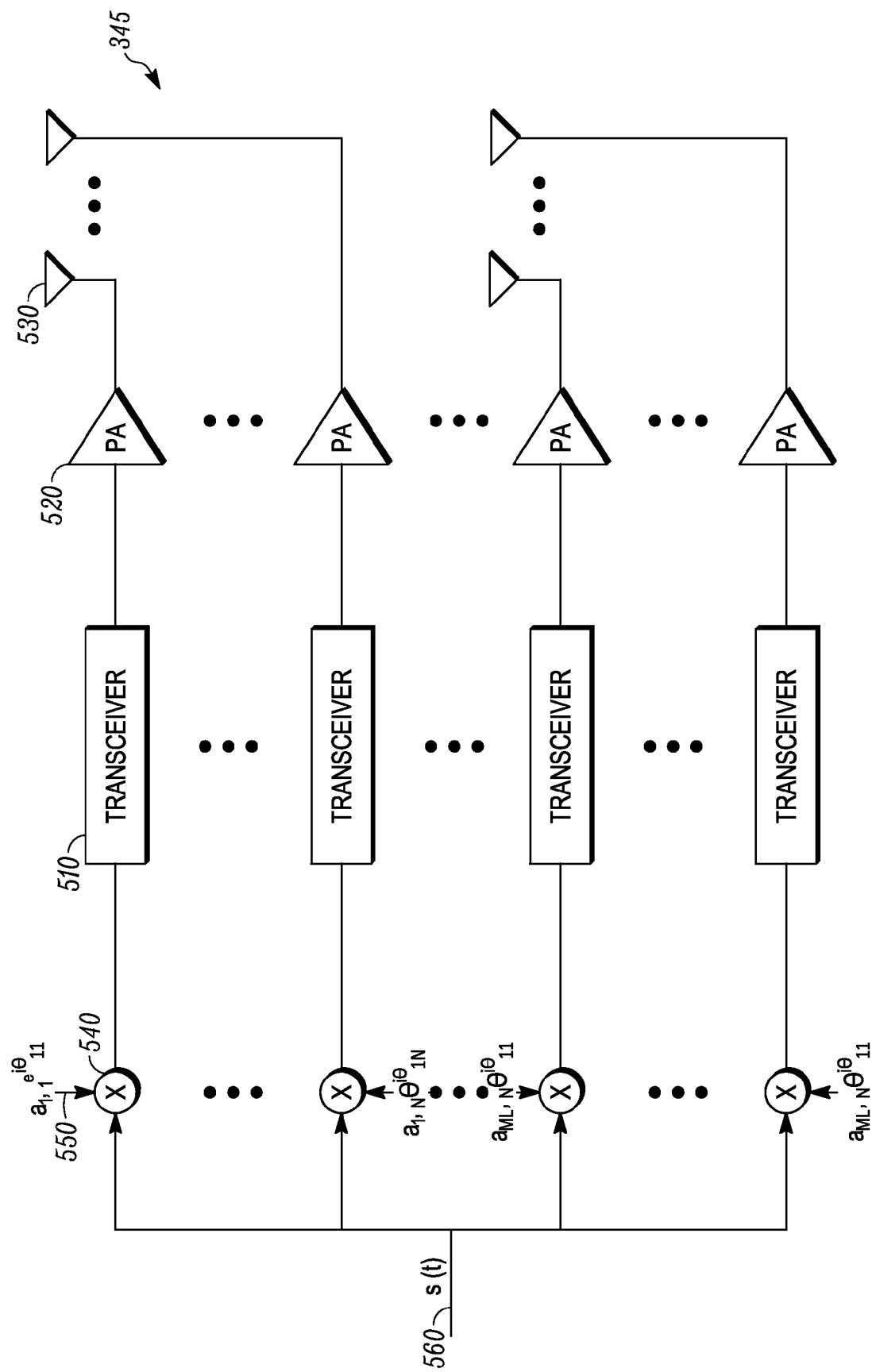
FIG. 5 is an block diagram of beamforming performed by a base station in an embodiment.

FIG. 5 is a block diagram that illustrates the signal processing that the eNB 120 (FIG. 1) carries out when communicating with the UE 110 (FIG. 1) according to an embodiment. A data stream 560, which is a spatial layer that includes a sequence of modulation symbols, is first multiplied in multipliers 540 by complex-valued weighting factors. The resulting baseband signals, one for each antenna 530 of the antenna array 345 (FIG. 3) are provided to transceivers 510, which convert the baseband signals to a carrier frequency.

The transceivers 510 may also apply filtering and additional processing to the signal. The transceiver output is then passed to power amplifiers (PA) 520, which increase the signal's power. The output of the PAs 520 is then fed to the antennas 530. The phase and amplitude of the signals in each antenna 530 can be therefore be controlled so as to obtain a constructive signal pattern at the UE 110 (FIG. 1). The beams or transmit radiation patterns can be adjusted in the horizontal and the vertical direction by changing the weighting factors 550. Transmission-power adjustment or deployment of beams for transmitting and receiving signals can be used to meet channel requirements. Beamforming can help to cope with multipath situations and can overcome extra attenuation by providing extra power concentration. Beamforming can also be used to reduce interference to adjacent cells or co-scheduled UEs within a cell or coordinating cluster of cells in case of MU-MIMO.

The method of beamforming illustrated in FIG. 5 is only an example of how to implement beamforming of a data stream 560. Alternatively, the weighting factors may be applied after the signal has been translated to the carrier frequency either immediately after the transceiver or after the PA or may be divided in to multiple weighting factors applied at different locations in the transmit chain, e.g., a weighting factor applied in baseband and a weighting factor applied after the transceiver.

Precoding is a part of 3GPP Release 8 and Release 10. According to 3GPP Release 8 and Release 10, the precoder takes as input a block of vectors $x(i)=[x^{(0)}(i) \ldots x^{(\nu-1)}(i)]^T$, $i=0, 1, \ldots, M_{symb}^{layer}-1$ from the layer mapping and generates a block of vectors $y(i)=[\ldots y^{(p)}(i) \ldots]^T$, $i=0, 1, \ldots,$ $M_{symb}^{ap}-1$ to be mapped onto resources on each of the antenna ports, where $y^{(p)}(i)$ represents the signal for antenna port p.

Precoding for spatial multiplexing is defined by $$\begin{bmatrix} y^{(0)}(i) \\ \vdots \\ y^{(P-1)}(i) \end{bmatrix} = W(i) \begin{bmatrix} x^{(0)}(i) \\ \vdots \\ x^{(\upsilon-1)}(i) \end{bmatrix}$$

where the precoding matrix W(i) is of size P×υ and $i=0, 1, \ldots, M_{symb}^{ap}-1$, $M_{symb}^{ap}=M_{symb}^{layer}$.

For spatial multiplexing, the values of W(i) can be selected among the precoder elements in the codebook configured in the eNodeB and the UE. The eNodeB can further confine the precoder selection in the UE to a subset of the elements in the codebook using codebook subset restrictions.

Release 8 precoding for two antenna ports (2 Tx) and four antenna ports (4 Tx) can be of the form as below.

For transmission on two antenna ports, $p \in \{0,1\}$, the precoding matrix W(i) can be selected from Table 1 or a subset thereof. For the closed-loop spatial multiplexing transmission mode, the codebook index 0 is not used when the number layers is υ=2.

TABLE 1

| Codebook | Codebook for transmission on antenna ports {0, 1} | |
|---|---|---|
| | Number of layers v | |
| index | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |

TABLE 1-continued

| Codebook | Codebook for transmission on antenna ports {0, 1} | |
|---|---|---|
| | Number of layers v | |
| index | 1 | 2 |
| 3 | $\frac{1}{\sqrt{2}}\begin{bmatrix}1\\-j\end{bmatrix}$ | — |

For transmission on four antenna ports, $p \in \{0,1,2,3\}$, the precoding matrix W can be selected from Table 2 or a subset thereof. The quantity $W_n^{\{s\}}$ denotes the matrix defined by the columns given by the set $\{s\}$ from the expression $W_n = I - 2u_n u_n^H / u_n^H u_n$ where I is the 4×4 identity matrix and the vector $u_n$ is given by Table 2.

TABLE 2

| Codebook index | $u_n$ | Codebook for transmission on antenna ports {0, 1, 2, 3} | | | |
|---|---|---|---|---|---|
| | | Number of layers υ | | | |
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Release 10 precoding for eight Tx antenna ports, each Precoding Matrix Indicator (PMI) value corresponds to a pair of codebook indices given in Table 3-1, 3-2, 3-3, 3-4, 3-5, 3-6, 3-7, or 3-8, where the quantities $\phi_n$ and $v_m$ are given by $$\phi_n = e^{j\pi n/2}$$

$$v_m = [1\ e^{j2\pi m/32}\ e^{j4\pi m/32}\ e^{j6\pi m/32}]^T$$

as follows: For 8 antenna ports {15,16,17,18,19,20,21,22}, a first PMI value of $n_1 \in \{0,1, \ldots, f(\upsilon)-1\}$ and a second PMI value of $n_2 \in \{0,1, \ldots, g(\upsilon)-1\}$ corresponds to the codebook indices $n_1$ and $n_2$ given in Table 3-j with υ equal to the associated rank indication (RI) value and where j=υ, f(υ)={16,16,4,4,4,4,4,1} and g(υ)={16,16,16,8,1,1,1,1}.

TABLE 3-1

| Codebook for 1-layer CSI reporting using antenna ports 15 to 22. | | | | |
|---|---|---|---|---|
| | $i_2$ | | | |
| $i_1$ | 0 | 1 | 2 | 3 |
| 0-15 | $W_{2i_1,0}^{(1)}$ | $W_{2i_1,1}^{(1)}$ | $W_{2i_1,2}^{(1)}$ | $W_{2i_1,3}^{(1)}$ |

TABLE 3-1-continued

Codebook for 1-layer CSI reporting using antenna ports 15 to 22.

| | $i_2$ | | | |
|---|---|---|---|---|
| $i_1$ | 4 | 5 | 6 | 7 |
| 0-15 | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| | $i_2$ | | | |
|---|---|---|---|---|
| $i_1$ | 8 | 9 | 10 | 11 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ |

| | $i_2$ | | | |
|---|---|---|---|---|
| $i_1$ | 12 | 13 | 14 | 15 |
| 0-15 | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n}^{(1)} = \frac{1}{\sqrt{8}} \begin{bmatrix} v_m \\ \varphi_n v_m \end{bmatrix}$

TABLE 3-2

Codebook for 2-layer CSI reporting using antenna ports 15 to 22.

| | $i_2$ | | | |
|---|---|---|---|---|
| $i_1$ | 0 | 1 | 2 | 3 |
| 0-15 | $W_{2i_1,2i_1,0}^{(2)}$ | $W_{2i_1,2i_1,1}^{(2)}$ | $W_{2i_1+1,2i_1,0}^{(2)}$ | $W_{2i_1+1,2i_1+1,1}^{(2)}$ |

| | $i_2$ | | | |
|---|---|---|---|---|
| $i_1$ | 4 | 5 | 6 | 7 |
| 0-15 | $W_{2i_1+2,2i_1+2,0}^{(2)}$ | $W_{2i_1+2,2i_1+2,1}^{(2)}$ | $W_{2i_1+3,2i_1+2,0}^{(2)}$ | $W_{2i_1+3,2i_1+1,1}^{(2)}$ |

| | $i_2$ | | | |
|---|---|---|---|---|
| $i_1$ | 8 | 9 | 10 | 11 |
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |

| | $i_2$ | | | |
|---|---|---|---|---|
| $i_1$ | 12 | 13 | 14 | 15 |
| 0-15 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $W_{m,n}^{(1)} = \frac{1}{\sqrt{8}} \begin{bmatrix} v_m \\ \varphi_n v_m \end{bmatrix}$

TABLE 3-3

Codebook for 3-layer CSI reporting using antenna ports 15 to 22.

| | $i_2$ | | |
|---|---|---|---|
| $i_1$ | 0 | 1 | 2 |
| 0-3 | $W_{8i_1,8i_1,8i_1+8}^{(3)}$ | $W_{8i_1+8,8i_1,8i_1+8}^{(3)}$ | $\tilde{W}_{8i_1,8i_1+8,8i_1+8}^{(3)}$ |

| | $i_2$ | | |
|---|---|---|---|
| $i_1$ | 3 | 4 | 5 |
| 0-3 | $\tilde{W}_{8i_1+8,8i_1,8i_1}^{(3)}$ | $W_{8i_1+2,8i_1+2,8i_1+10}^{(3)}$ | $W_{8i_1+10,8i_1+2,8i_1+10}^{(3)}$ |

TABLE 3-3-continued

Codebook for 3-layer CSI reporting using antenna ports 15 to 22.

| | $i_2$ | | |
|---|---|---|---|
| $i_1$ | 6 | 7 | 8 |
| 0-3 | $\tilde{W}_{8i_1+2,8i_1+10,8i_1+10}^{(3)}$ | $\tilde{W}_{8i_1+10,8i_1+2,8i_1+2}^{(3)}$ | $W_{8i_1+4,8i_1+4,8i_1+12}^{(3)}$ |

| | $i_2$ | | |
|---|---|---|---|
| $i_1$ | 9 | 10 | 11 |
| 0-3 | $W_{8i_1+12,8i_1+4,8i_1+12}^{(3)}$ | $\tilde{W}_{8i_1+4,8i_1+12,8i_1+12}^{(3)}$ | $\tilde{W}_{8i_1+12,8i_1+4,8i_1+4}^{(3)}$ |

| | $i_2$ | | |
|---|---|---|---|
| $i_1$ | 12 | 13 | 14 |
| 0-3 | $W_{8i_1+6,8i_1+6,8i_1+14}^{(3)}$ | $W_{8i_1+14,8i_1+6,8i_1+14}^{(3)}$ | $\tilde{W}_{8i_1+6,8i_1+14,8i_1+14}^{(3)}$ |

| | $i_2$ |
|---|---|
| $i_1$ | 15 |
| 0-3 | $\tilde{W}_{8i_1+14,8i_1+6,8i_1+6}^{(3)}$ | where $W_{m,m',m''}^{(3)} = \frac{1}{\sqrt{24}} \begin{bmatrix} v_m & v_{m'} & v_{m''} \\ v_m & -v_{m'} & -v_{m''} \end{bmatrix}$, $\tilde{W}_{m,m',m''}^{(3)} = \frac{1}{\sqrt{24}} \begin{bmatrix} v_m & v_{m'} & v_{m''} \\ v_m & v_{m'} & -v_{m''} \end{bmatrix}$

TABLE 3-4

Codebook for 4-layer CSI reporting using antenna ports 15 to 22.

| | $i_2$ | | | |
|---|---|---|---|---|
| $i_1$ | 0 | 1 | 2 | 3 |
| 0-3 | $W_{8i_1,8i_1+8,0}^{(4)}$ | $W_{8i_1,8i_1+8,1}^{(4)}$ | $W_{8i_1+2,8i_1+10,0}^{(4)}$ | $W_{8i_1+2,8i_1+10,1}^{(4)}$ |

| | $i_2$ | | | |
|---|---|---|---|---|
| $i_1$ | 4 | 5 | 6 | 7 |
| 0-3 | $W_{8i_1+4,8i_1+12,0}^{(4)}$ | $W_{8i_1+4,8i_1+12,1}^{(4)}$ | $W_{8i_1+6,8i_1+14,0}^{(4)}$ | $W_{8i_1+6,8i_1+14,1}^{(4)}$ | where $W_{m,m',n}^{(4)} = \frac{1}{\sqrt{32}} \begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$

TABLE 3-5

Codebook for 5-layer CSI reporting using antenna ports 15 to 22.

| | $i_2$ |
|---|---|
| $i_1$ | 0 |
| 0-3 | $W_{i_1}^{(5)} = \frac{1}{\sqrt{40}} \begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ |

TABLE 3-6

Codebook for 6-layer CSI reporting using antenna ports 15 to 22.

| | $i_2$ |
|---|---|
| $i_1$ | 0 |
| 0-3 | $W_{i_1}^{(6)} = \frac{1}{\sqrt{48}} \begin{bmatrix} v_{2i_1} & v_{2i_1} & v_{2i_1+8} & v_{2i_1+8} & v_{2i_1+16} & v_{2i_1+16} \\ v_{2i_1} & -v_{2i_1} & v_{2i_1+8} & -v_{2i_1+8} & v_{2i_1+16} & -v_{2i_1+16} \end{bmatrix}$ |

TABLE 3-7

Codebook for 7-layer CSI reporting using antenna ports 15 to 22.

| $i_1$ | $i_2$ 0 |
|---|---|
| 0-3 | $W_{i_1}^{(7)} = \frac{1}{\sqrt{56}} \begin{bmatrix} v_{2i_1} & v_{2i_1} & v_{2i_1+8} & v_{2i_1+8} & v_{2i_1+16} & v_{2i_1+16} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} \end{bmatrix}$ |

TABLE 3-8

Codebook for 8-layer CSI reporting using antenna ports 15 to 22.

| $i_1$ | $i_2$ 0 |
|---|---|
| 0 | $W_{i_1}^{(8)} = \frac{1}{8} \begin{bmatrix} v_{2i_1} & v_{2i_1} & v_{2i_1+8} & v_{2i_1+8} & v_{2i_1+16} & v_{2i_1+16} & v_{2i_1+24} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} & -v_{2i_1+24} \end{bmatrix}$ |

For a Release 10, 8 Tx codebook, precoding can be represented as $$y = W_1 W_2 x \quad \text{(Equation 1)}$$

where $W_1$ can be a wideband precoder that takes advantage of the correlation properties of the channel, properties which are long-term in nature, and $W_2$ performs co-phasing on a short-term basis. Here, x is the vector of modulated symbols and y is the vector of signal transmitted from each PA. The matrix $W_1$ has the structure $$W_1 = \begin{bmatrix} \tilde{W} & 0 \\ 0 & \tilde{W} \end{bmatrix} \quad \text{(Equation 2)}$$

where the $N_T/2 \times r$ matrix $\tilde{W}$ has columns taken from an oversampled Discrete Fourier Transform (DFT) matrix. The $2r \times r$ co-phasing matrix $W_2$ is of the form $$W_2 = \begin{bmatrix} 1 \\ \alpha \end{bmatrix}; \alpha \in \{1, -1, j, -j\} \quad \text{(Equation 3)}$$

for rank 1 and $$W_2 = \begin{bmatrix} 1 & 0 \\ 0 & 1 \\ \alpha & 0 \\ 0 & -\alpha \end{bmatrix}; \alpha \in \{1, j\} \quad \text{(Equation 4)}$$

for rank 2.

The present disclosure sets forth 4 Tx codebook enhancements that may be used as further enhancements to the DL-MIMO Work Item in LTE Release 12 in an embodiment. It has been proposed that the existing codebooks (Release 8) based on Householder reflections are sufficient. It has also been proposed that there is a need to define a dual codebook structure (similar to the Release 10 8-Tx codebook in principle). The Householder reflections-based 4 Tx codebook is not ideally suited for MU-MIMO scheduling as the limited 4-bit PMI feedback results in suboptimal Block-Zero Forcing (ZF) or Zero-Forcing Dirty Paper Coding (ZF-DPC) implementations at the eNB. This leads to co-scheduled user interference at the receiver limiting the sum rate.

To illustrate, consider a K-user system with each user equipped N receive antennas and the base station equipped with M (<K) Tx antennas. For simplicity, consider the case of N=1 receive antennas at each user. The received signal vector at the K users can be written as $$y = HUs + v$$

where H is the K×M channel matrix, U is the M×M precoding matrix, s is the M×1 Tx signal vector and the co-channel interference plus noise, n, is complex Gaussian, i.e., $v \sim CN(0, \sigma^2 I)$. The sum-rate for this system is $$R(U) := \sum_{m=1}^{M} \log_2 \left( 1 + \frac{M^{-1} |h_{k(m)}^* u_{k(m)}|^2}{\sigma^2 + M^{-1} \sum_{l \neq k(m)} |h_l^* u_l|^2} \right)$$

where $h_k^*$ is the k-th row of H, $u_k$ is the k-th column of U and k(m) denotes the user selected for the m-th stream. In the large-SNR regime ($\sigma^2 \to 0$), the ergodic sum-rate can be written as $$E[R(U)] \xrightarrow{\sigma^2 \to 0} E\left[ \sum_{m=1}^{M} \log_2 \left( 1 + \frac{|h_{k(m)}^* u_{k(m)}|^2}{\sum_{l \neq k(m)} |h_{k(m)}^* u_l|^2} \right) \right] =$$

$$E\left[ \sum_{m=1}^{M} \log_2 \left( 1 + \frac{|h_{k(m)}^* u_{k(m)}|^2}{|h_{k(m)}^*|^2 - |h_{k(m)}^* u_{k(m)}|^2} \right) \right] =$$

$$E\left[ \sum_{m=1}^{M} \log_2 \left( 1 + \frac{|h_{k(m)}^*|^2}{|h_{k(m)}^*|^2 - |h_{k(m)}^* u_{k(m)}|^2} \right) \right] =$$

$$-E\left[ \sum_{m=1}^{M} \log_2 (1 - |g_{k(m)}^* u_{k(m)}|^2) \right]$$

under the assumption that U is unitary and $g_{k(m)}^* := h_{k(m)}^* / |h_{k(m)}^*|$.

If the UEs use a first codebook that allows the eNB to realize a certain set of absolute values of the inner products $\{|g_{k(m)}^* u_{k(m)}|_{C_1}\}$ and there exists a second codebook that allows the eNB to realize a second set of inner products $\{|g_{k(m)}^* u_{k(m)}|_{C_2}\}$ such that $$|g_{k(m)}^* u_{k(m)}|_{C_2} > |g_{k(m)}^* u_{k(m)}|_{C_1}$$

holds with non-zero probability, then the MU-MIMO sum rate can be increased.

In an embodiment, codebook enhancement by linear extension can be used to increase the MU-MIMO sum rate. Suppose that the B-bit rank-L codebook comprising M×L matrices is denoted as $C^{(L)} = \{U_j : 1 \leq j \leq 2^B\}$ where the columns within each matrix are mutually orthonormal. If $v_1$ and $v_2$ are two distinct columns of some $U \in C^{(L)}$, the vector formed by the linear extension $u := (v_1 + \alpha v_2)/\sqrt{1 + |\alpha|^2}$ is also a unit vector, where a is a real or complex-valued number.

A Release 8, 4 Tx codebook has the property that the unit vectors comprising the $C^{(1)}$ codebook are one of the 4 columns of a corresponding matrix in the $C^{(4)}$ codebook. Therefore, the codebook enhancement can be viewed as a 2-step process:

1. The k-th UE can be configured to feed back the best $v_1$ vector using rank-1 feedback (e.g., using an appropriate codebook subset restriction).
2. Since $v_1$ is a column of some matrix $U \in C^{(4)}$, the UE can then find a $v_2$ (different from $v_1$) which is another distinct column from U so as to maximize the inner product $|h^*_k u|$ where:

$$u := (v_1 + \alpha v_2)/\sqrt{1+|\alpha|^2} \quad \text{(Equation 5)}$$

a. In an embodiment, only $\lceil \log_2 M \rceil = 2$ (M=4) additional bits are required to feedback
      i. the index of $v_2$ given that $v_1$ has been selected by the usual rank-1 PMI feedback and
      ii. the case when $\alpha=0$ (or $v_2=0$) is optimal
   b. The parameter $\alpha$ can be fixed (in the specification) or can be quantized to a B' bit codebook and fed back to the base station.

Multiple-Input Single-Output (MISO) Receiver SNR with Codebook Linear Extension.

For simplicity, $\alpha$ can be real valued. A MISO receiver at the UE selects a PMI vector so as to maximize the inner product $|g^*_k u|$, where $g_k = h_k/|h_k|$. Note that $$|g^*_k u|^2 = \frac{1}{1+\alpha^2}(|g^*_k v_1|^2 + \alpha^2 |g^*_k v_2|^2 + 2\alpha \mathrm{Re}(g^*_k v_1 v^*_2 g_k)).$$

Futhermore, $$a_2 := |g^*_k v_1|^2$$

$$b_2 := |g^*_k v_2|^2$$

$$c := \mathrm{Re}(g^*_k v_1 v^*_2 g_k)/ab$$

In an embodiment, $0 \leq |c| \leq 1$ and $b^2 \leq a^2$, the latter by the virtue of the fact $$\alpha^2 = \frac{1}{z} - 1,$$

that rank-1 PMI feedback selected $v_1$. By change of variables $f(z) := |g^*_k u|^2 = a^2 z + b^2(1-z) \pm 2abc\sqrt{z-z^2}$ is derived. The sign ambiguity comes from a choice for the change of variables. It is also possible that $\frac{1}{2} < z \leq 1$ and $$f'(z) = a^2 - b^2 \pm \frac{c(1-2z)}{\sqrt{z-z^2}}$$

$$f''(z) = \pm \frac{-c}{2(z-z^2)^{\frac{3}{2}}}$$

By selecting a positive solution for $\alpha$ (for a given $v_2$, a positive solution is used for $\alpha$ (i.e., $\alpha > 0$) when $c > 0$; otherwise choose a negative solution for $\alpha$), it can be ensured that f(z) is concave and has a unique maximum.

It can be noted that $$f(z) - a^2 = \sqrt{1-z}\{-(a^2-b^2)\sqrt{1-z} \pm 2abc\sqrt{z}\}.$$

If a=b, i.e., $|g^*_k v_1| = |g^*_k v_2|$, selecting the positive root for $\alpha$ (again, for a given $v_2$, a positive solution is used for $\alpha$ (i.e., $\alpha > 0$) when $c > 0$; otherwise choose a negative solution for $\alpha$) leads to $f(z) - a^2 > 0$ or $|g^*_k u| > |g^*_k v_1|$.

For a>b, by selecting $$\frac{1}{\alpha^2} = \frac{z}{1-z} > \frac{(a^2-b^2)^2}{4c^2 a^2 b^2}$$

it is determined that $f(z) - a^2 > 0$ or $|g^*_k u| > |g^*_k v_1|$.

As understood from the foregoing, the maximum absolute value of inner product $|g^*_k u|$ can be increased by allowing linear extensions to the codebook leading to an improvement in the supported SNR and the reported CQI.

UE Feedback

In an embodiment, a UE can select a best $v_1$, $v_2$ and $\alpha$ jointly such that $$(v_1, v_2, \alpha) = \arg\max_{(v_1, v_2, \alpha)} |g^*_k u|^2$$

The range $z \in (0.5, 1]$ can be sampled (e.g., uniformly sampled) with B' bits and the corresponding $\alpha$ can be fed back to the base station along with a 2-bit feedback for $v_2$. Alternatively, $\alpha$ can be directly quantized with B' bits and the corresponding $\alpha$ can be fed back to the base station along with a 2-bit feedback for $v_2$. With this approach, the PMI feedback comprises
1. 4-bit PMI to feedback $v_1$
2. 2-bit PMI to feedback $v_2$
3. B' bits to feedback $\alpha$.

$\alpha$, $v_2$ and/or $v_1$ may be fed back separately (separate encoding e.g. mapped to different set of bits in a message) or two or more of $\alpha$, $v_2$ and $v_1$ may be jointly encoded and fed back by the UE in one CSI (Channel State Information) report. For example, $v_1$ may be fed back as done currently in Releases 8-11 using a 4-bit PMI indicator and ($\alpha$, $v_2$) may be jointly encoded and fed-back as a X-bit indicator.

The PMI feedback of $v_1$, $\alpha$, $v_2$ may be in the same uplink subframe or in different uplink subframes. The uplink subframe carrying PMI feedback of $v_1$, $\alpha$, and/or $v_2$, may also carry other CSI related information such as Rank Indicator (RI), Precoding Type Indicator (PTI), and CQI (Channel Quality Information) conditioned on the selected PMI u. The CQI may be wideband CQI (e.g., spanning the entire downlink system bandwidth) or subband CQI (e.g., a set of k contiguous PRBs (Physical Resource Blocks) where k is a function of system bandwidth). For example, the 4-bit PMI indicator for $v_1$ may be indicated in a first subframe and the $\alpha$, $v_2$ may be indicated in a second uplink subframe, the second uplink subframe being different than the first uplink subframe. The first uplink subframe may carry other CSI related information such as a Rank Indicator (RI). The second uplink subframe may carry other CSI related information such as a CQI. In another embodiment, the RI and the PTI may be indicated in a CSI report in a subframe other than the first and second subframe.

In a second approach, a is fixed (in the specification) and UE selects best $v_1$ and $v_2$ such that $$(v_1, v_2) = \arg\max_{(v_1, v_2)} |g^*_k u|^2.$$

With this approach, the components of PMI are same as described above except that feedback for α is absent.

For case of α being fixed, $v_2$ can be fed back using a 2-bit PMI (second PMI) indicator (including a state for the case of $v_2=0$ or α=0). The PMI feedback of $v_1$, $v_2$ may be in the same uplink subframe or in different uplink subframes. For example, the 4-bit PMI indicator for $v_1$ may be indicated in a first subframe and the 2-bit PMI indicator $v_2$ may be indicated in a second uplink subframe, the second uplink subframe being different than the first uplink subframe. The uplink subframe carrying PMI feedback of $v_1$ and/or $v_2$, may also carry other CSI related information such as Rank Indicator (RI), Precoding Type Indicator (PTI), and CQI (Channel Quality Information) conditioned on the selected PMI u. The CQI may be wideband CQI (e.g., spanning the entire downlink system bandwidth) or subband CQI (e.g., a set of k contiguous PRBs (Physical Resource Blocks) where k is a function of system bandwidth).

For example, the 4-bit PMI indicator for $v_1$ may be indicated in a first subframe and the $v_2$ may be indicated in a second uplink subframe, the second uplink subframe being different than the first uplink subframe. The first uplink subframe may carry other CSI related information such as a Rank Indicator (RI). The second uplink subframe may carry other CSI related information such as a CQI. In another embodiment, the RI and the PTI may be indicated in a CSI report in a subframe other than the first and second subframe.

Relation of Linear Extension to $W_1$ $W_2$ Product Form

The overall precoding matrix can be written down in product form as below.

$$P = \underbrace{[U(:,1)\ U(:,2)\ U(:,3)\ U(:,4)]}_{W_1} \underbrace{\begin{bmatrix} 1/\sqrt{1+|\alpha|^2} \\ \alpha_2/\sqrt{1+|\alpha|^2} \\ \alpha_3/\sqrt{1+|\alpha|^2} \\ \alpha_4/\sqrt{1+|\alpha|^2} \end{bmatrix}}_{W_2}$$

where only one of $\alpha_2$, $\alpha_3$ and $\alpha_4$ is equal to α and the remainder are zeros and where $U \in C^{(4)}$.

Linear Extension for Rank>1

This approach can be extended to the multiple rank (rank>1) case by adding more columns to the second matrix in the product form. Specifically, for rank 2:

$$P = \underbrace{[U(:,1)\ U(:,2)\ U(:,3)\ U(:,4)]}_{W_1} c_{norm} \underbrace{\begin{bmatrix} 1 & \alpha_{12} \\ \alpha_{21} & \alpha_{22} \\ \alpha_{31} & \alpha_{32} \\ \alpha_{41} & \alpha_{42} \end{bmatrix}}_{W_2}$$

where $c_{norm} = \left(1 + |\alpha_{12}|^2 + \sum_{i=2}^{4}\sum_{j=1}^{2}|\alpha_{ij}|^2\right)^{-1/2}$ and $\alpha_{12} + \sum_{i=2}^{4} \alpha_{i1}\bar{\alpha}_{j2} = 0$, thus ensuring that the precoder has unit power and the columns of the overall precoder are orthogonal.

In LTE Release 8, for rank 2, $\alpha_{12}=0$, $\alpha_{21}=\alpha_{31}=\alpha_{41}=0$ and $\alpha_{12}=1$ for only one i>1. For the rank 2 precoding matrices for which $\alpha_{22}=1$, linear extension to the rank 2 codebook can be formed by letting the second matrix take one the following two alternative forms:

$$W_2 = c_{norm}\begin{bmatrix} 1 & 0 \\ 0 & 1 \\ \alpha_{31} & 0 \\ 0 & \alpha_{42} \end{bmatrix} \text{ and } W_2 = c_{norm}\begin{bmatrix} 1 & 0 \\ 0 & 1 \\ 0 & \alpha_{32} \\ \alpha_{41} & 0 \end{bmatrix},$$

where the $\alpha_{ij}$'s shown are non-zero. Extending the Release 8 codebook for rank 3 and rank 4 needs further consideration.

General Representation in Product Form

Linear extension can be represented in a general form:

$$P = \underbrace{[U(:,1)\ U(:,2)\ \ldots\ U(:,n)]}_{W_1} c_{norm} \underbrace{\begin{bmatrix} \alpha_{1,1} & \cdots & \alpha_{1,v} \\ \vdots & \ddots & \vdots \\ \alpha_{n,1} & \cdots & \alpha_{n,v} \end{bmatrix}}_{W_2}$$

where U is a $N_{TX} \times n$ matrix from a codebook with unit-norm columns, $U(:,j)$ is the j-th columns of U, $\alpha_{j,k}$ are real-valued or complex-valued numbers, and v is the number of spatial layers or rank associated with the precoding matrix P.

Since, $$P = c_{norm}\left[\sum_{j=1}^{n}\alpha_{j,1}U(:,j),\ \sum_{j=1}^{n}\alpha_{j,2}U(:,j)\ \ldots\ \sum_{j=1}^{n}\alpha_{j,v}U(:,j)\right]$$

the k-th column of P (k=1, ..., v) is a linear combination of distinct columns of U.

Rank-1 Codebook

In an embodiment, the set of precoders are denoted by a set of 64 vectors $v_i$, $i \in \{0, 1, \ldots, 63\}$, each of length 4. The first 16 precoders of the codebook are given by the 16 Release 8 precoding matrices, $v_i = W_i^{(1)}$, $i = \{0, 1, \ldots, 15\}$, where $W_i^{(1)}$, $i = \{0, 1, \ldots, 15\}$ are defined in Table 2. $W_n^{(s)}$ denotes the matrix defined by the column set (s) of the unitary matrix $W_n$ formed by Householder reflections, where $W_n = I - 2u_n u_n^H / u_n^H u_n$ where I is the 4×4 identity matrix and the vector $u_n$ is given by Table 2.

The remaining 48 precoders are the set of all possible precoders of the form:

$$v_k = \frac{W_{i(k)}^{(1)} + \alpha W_{i(k)}^{(j)}}{(1+|\alpha|^2)^{1/2}}$$

where j≠1, j={2, 3, 4}. We can choose a fixed value for α (e.g., α equal to 0.8).

In an embodiment, the UE can first choose the best Release 8 precoder within the existing set of 16 rank-1 precoders $v_i = W_i^{(1)}$, $i = \{0, 1, \ldots, 15\}$, and then can determine if this best Release 8 precoder (with codebook index i) can be improved by linear combination with any one of the column vectors (scaled by α) $W_i^{(2)}$, $W_i^{(3)}$, and $W_i^{(4)}$. With this codebook structure, the UE processing can be simplified into two steps:

Step 1. UE selects the best $W_i^{(1)}$ from a set of 16 candidates

Step 2. UE selects the best $W_i^{(j)}$ from the set of $\{0, W_i^{(2)}, W_i^{(3)}, W_i^{(4)}\}$ where 0 is the null vector conditioned on already selected best $W_i^{(1)}$ from Step 1.

Accordingly, the UE is able to select the pair $(W_i^{(1)}, W_i^{(j)})$ based on evaluating an SINR (or CQI) metric over a total of 19 candidates (as opposed to 16 candidates in Release 8 for rank-1 feedback). The last three candidates are linear combinations of Release 8 rank-1 precoding vectors that depend on the selected $W_i^{(1)}$.

The four candidates in Step 1 and Step 2 above can be written as:

$$v_k = \underbrace{[W_i^{(1)}, W_i^{(2)}, W_i^{(3)}, W_i^{(4)}]}_{W_1} \underbrace{\frac{1}{(1+|\alpha|^2)^{1/2}} \begin{bmatrix} 1 \\ a_2 \\ a_3 \\ a_4 \end{bmatrix}}_{W_2} = W_1 W_2$$

where only one $\alpha_j = \alpha$ for exactly one value of j such that $2 \leq j \leq 4$ and equal to zero otherwise. The precoding vector $v_k$ complies with the $W_1 W_2$ product form where $W_1$ can correspond to wideband PMI and $W_2$ can correspond to subband PMI.

Alternatively, the precoding vector obtained by linear extension can be decomposed as:

$$v_k = \underbrace{I}_{W_1} \underbrace{\frac{1}{(1+|\alpha|^2)^{1/2}} [W_i^{(1)}, W_i^{(2)}, W_i^{(3)}, W_i^{(4)}] \begin{bmatrix} 1 \\ a_2 \\ a_3 \\ a_4 \end{bmatrix}}_{W_2} = W_1 W_2$$

such that $W_1 = I$.

There are two alternatives for selecting $\alpha$.

Alternative 1: Fixed $\alpha$

The optimal value for $\alpha$ can be determined based on system simulations. For example, a value of $\alpha=0.8$ can be used.

Alternative 2: Variable $\alpha$

For this alternative, larger codebooks must be considered. For example, the codebook can be expanded by increasing the alphabet for $\alpha$ from the single value of 0.8 to a set of values such as $\alpha \in \{-0.8, 0.8\}$. In general, if the size of the allowed alphabet for $\alpha$ is K, the size of the codebook is given by $16 \cdot (1+3K)$, and the number of candidate precoders that must be evaluated by the UE is $16+3K$.

Rank-2 Codebook (First Embodiment)

In one embodiment, the existing rank-2 codebook in Table 2 for four Tx antennas is specified in the column for $\upsilon=2$ layers of Table 2. The codebook consists of a total of sixteen 4×2 matrices. For rank-2 transmissions, the size of this codebook is expanded from 16 to 48 in the following manner.

To begin, the 16 rank-2 codebooks from Table 2 are included. The following three 4×4 permutation matrices can then be defined. The first of these permutation matrices $P_1$ is the identity matrix. The second permutation matrix $P_2$ exchanges the second and third columns and is given by:

$$P_2 = \begin{bmatrix} 1 & 0 & 0 & 0 \\ 0 & 0 & 1 & 0 \\ 0 & 1 & 0 & 0 \\ 0 & 0 & 0 & 1 \end{bmatrix}.$$

The third permutation matrix $P_3$ exchanges the second and fourth columns and is given by $$P_3 = \begin{bmatrix} 1 & 0 & 0 & 0 \\ 0 & 0 & 0 & 1 \\ 0 & 0 & 1 & 0 \\ 0 & 1 & 0 & 0 \end{bmatrix}.$$

$W_{i,2}$ can denote the rank-2 precoding matrix corresponding to the codebook index i in Table 2. With the above permutation matrices, the Release-8 rank-2 codebook in Table 2 can be expressed as $$W_{i,2} = W_i \cdot P_{m(i)} \begin{bmatrix} 1 & 0 \\ 0 & 1 \\ 0 & 0 \\ 0 & 0 \end{bmatrix} \cdot \frac{1}{\sqrt{2}} \quad i = \{0, 1, \ldots, 15\},$$

where the unitary matrix $W_n$ is $W_n = I - 2u_n u_n^H / u_n^H u_n$ where I is the 4×4 identity matrix and the vector $u_n$ is given by Table 2, and m (0 is given in Table 4:

| i= | m(i) |
|---|---|
| 0 | 3 |
| 1 | 1 |
| 2 | 1 |
| 3 | 1 |
| 4 | 3 |
| 5 | 3 |
| 6 | 2 |
| 7 | 2 |
| 8 | 1 |
| 9 | 3 |
| 10 | 2 |
| 11 | 2 |
| 12 | 1 |
| 13 | 2 |
| 14 | 2 |
| 15 | 1 |

The codebook from 16 to 48 can be extended by defining $$W_{i,2} = W_{mod(i,16)} \cdot P_{m(mod(i,16))} \cdot \begin{bmatrix} 1 & 0 \\ 0 & 1 \\ \alpha & 0 \\ 0 & \alpha \end{bmatrix} \cdot \frac{1}{\sqrt{2(1+|\alpha|^2)}}$$

$i = \{16, 17, \ldots, 31\}$ and $$W_{i,2} = W_{mod(i,16)} \cdot P_{m(mod(i,16))} \cdot \begin{bmatrix} 1 & 0 \\ 0 & 1 \\ 0 & \alpha \\ \alpha & 0 \end{bmatrix} \cdot \frac{1}{\sqrt{2(1+|\alpha|^2)}}$$

$i = \{32, 17, \ldots, 47\}$

In the enhanced codebook, the triplet ($W_{i',2}$, $W_{i'+16,2}$, $W_{i'+32,2}$) where i'=0, 2, ..., 15 corresponds to the original codebook and its linear extensions (e.g., ($W_{0,2}$, $W_{16,2}$, $W_{32,2}$) is one triplet where $W_{16,2}$ and $W_{32,2}$ are linear extensions of $W_{0,2}$).

Similar to the rank-1 case, the UE can first choose the best Release 8 precoder within the existing set of 16 rank-2 precoders $W_{i,2}$=, i={0, 1, ..., 15}, and then can determine if this best Release 8 precoder (with codebook index i) can be improved by linear combinations with the unused column vectors (scaled by α) of $W_i$. With this method, the UE may only need to evaluate a total of 18 rank-2 candidate precoders which includes first selecting a precoder from the set of 16 existing Release 8 rank-2 precoders $W_{i,2}$=, i={0, 1, ..., 15}, and then selecting from two linear combination rank-2 precoders that depend on the selected $W_{i,2}$.

Rank-2 Codebook (Second Embodiment)

In another embodiment, the existing rank-2 codebook for four Tx antennas is specified in the column for υ=2 layers of Table 2. The codebook consists of a total of sixteen 4×2 matrices. For rank-2 transmissions, the size of the codebook is expanded from 16 to 48 in the following manner. Each of the rank 2 codebooks in Table 2 can be represented in the following manner:

$$W_{i,2} = W_i \cdot \begin{bmatrix} \beta^i_{1,1} & \beta^i_{1,2} \\ \beta^i_{2,1} & \beta^i_{1,2} \\ \beta^i_{3,1} & \beta^i_{1,2} \\ \beta^i_{4,1} & \beta^i_{1,2} \end{bmatrix} \cdot \frac{1}{\sqrt{2}} \quad i = \{0, 1, \ldots, 15\},$$

where $W_{i,2}$ denotes the rank two precoding matrix corresponding to codebook index i in Table 2, and the vectors $\beta^i_{\cdot,1}$ and $\beta^i_{\cdot,2}$ also depend on the codebook index i. The unitary matrix $W_n$ is $W_n = I - 2u_n u_n^H / u_n^H u_n$ where I is the 4×4 identity matrix and the vector $u_n$ is given by Table 2. The vectors $\beta^i_{\cdot,1}$ and $\beta^i_{\cdot,2}$ for all i are defined in the Table 5 below.

TABLE 5

Vectors $\beta^i_{\cdot,1}$ and $\beta^i_{\cdot,2}$ for Release 8 codebook

| i = | $\beta^i_{1,1}$ | $\beta^i_{2,1}$ | $\beta^i_{3,1}$ | $\beta^i_{4,1}$ | $\beta^i_{1,2}$ | $\beta^i_{2,2}$ | $\beta^i_{3,2}$ | $\beta^i_{4,2}$ |
|---|---|---|---|---|---|---|---|---|
| 0 | 1 | 0 | 0 | 0 | 0 | 0 | 0 | 1 |
| 1 | 1 | 0 | 0 | 0 | 0 | 1 | 0 | 0 |
| 2 | 1 | 0 | 0 | 0 | 0 | 1 | 0 | 0 |
| 3 | 1 | 0 | 0 | 0 | 0 | 1 | 0 | 0 |
| 4 | 1 | 0 | 0 | 0 | 0 | 0 | 0 | 1 |
| 5 | 1 | 0 | 0 | 0 | 0 | 0 | 0 | 1 |
| 6 | 1 | 0 | 0 | 0 | 0 | 0 | 1 | 0 |
| 7 | 1 | 0 | 0 | 0 | 0 | 0 | 1 | 0 |
| 8 | 1 | 0 | 0 | 0 | 0 | 1 | 0 | 0 |
| 9 | 1 | 0 | 0 | 0 | 0 | 0 | 0 | 1 |
| 10 | 1 | 0 | 0 | 0 | 0 | 0 | 1 | 0 |
| 11 | 1 | 0 | 0 | 0 | 0 | 0 | 1 | 0 |
| 12 | 1 | 0 | 0 | 0 | 0 | 1 | 0 | 0 |
| 13 | 1 | 0 | 0 | 0 | 0 | 0 | 1 | 0 |
| 14 | 1 | 0 | 0 | 0 | 0 | 0 | 1 | 0 |
| 15 | 1 | 0 | 0 | 0 | 0 | 1 | 0 | 0 |

In order to extend the rank-2 codebook to size 48, the following additional pre-coding matrices may be used:

$$W_{i,2} = W_{mod(i,16)} \cdot \begin{bmatrix} \beta^i_{1,1} & \beta^i_{1,2} \\ \beta^i_{2,1} & \beta^i_{1,2} \\ \beta^i_{3,1} & \beta^i_{1,2} \\ \beta^i_{4,1} & \beta^i_{1,2} \end{bmatrix} \cdot \frac{1}{\sqrt{2(1+|\alpha|^2)}}$$

$$i = \{16, 17, \ldots, 47\}$$

where α=0.8, and $\beta^i_{\cdot,1}$ and $\beta^i_{\cdot,2}$ for i∈{16, 17, ..., 47} are defined in Table 6:

TABLE 6

Vectors $\beta^i_{\cdot,1}$ and $\beta^i_{\cdot,2}$ for the Enhanced codebook

| i = | $\beta^i_{1,1}$ | $\beta^i_{2,1}$ | $\beta^i_{3,1}$ | $\beta^i_{4,1}$ | $\beta^i_{1,2}$ | $\beta^i_{2,2}$ | $\beta^i_{3,2}$ | $\beta^i_{4,2}$ |
|---|---|---|---|---|---|---|---|---|
| 16 | 1 | α | 0 | 0 | 0 | 0 | α | 1 |
| 17 | 1 | 0 | α | 0 | 0 | 1 | 0 | α |
| 18 | 1 | 0 | α | 0 | 0 | 1 | 0 | α |
| 19 | 1 | 0 | α | 0 | 0 | 1 | 0 | α |
| 20 | 1 | 0 | α | 0 | 0 | 0 | α | 1 |
| 21 | 1 | α | 0 | 0 | 0 | 0 | α | 1 |
| 22 | 1 | α | 0 | 0 | 0 | 0 | 1 | α |
| 23 | 1 | α | 0 | 0 | 0 | 0 | 1 | α |
| 24 | 1 | 0 | α | 0 | 0 | 1 | 0 | α |
| 25 | 1 | α | 0 | 0 | 0 | 0 | α | 1 |
| 26 | 1 | α | 0 | 0 | 0 | 0 | 1 | α |
| 27 | 1 | α | 0 | 0 | 0 | 0 | 1 | α |
| 28 | 1 | 0 | α | 0 | 0 | 1 | 0 | α |
| 29 | 1 | α | 0 | 0 | 0 | 0 | 1 | α |
| 30 | 1 | α | 0 | 0 | 0 | 0 | 1 | α |
| 31 | 1 | 0 | α | 0 | 0 | 1 | 0 | α |
| 32 | 1 | 0 | α | 0 | 0 | α | 0 | 1 |
| 33 | 1 | 0 | 0 | α | 0 | 1 | α | 0 |
| 34 | 1 | 0 | 0 | α | 0 | 1 | α | 0 |
| 35 | 1 | 0 | 0 | α | 0 | 1 | α | 0 |
| 36 | 1 | 0 | 0 | α | 0 | α | 0 | 1 |
| 37 | 1 | 0 | α | 0 | 0 | α | 0 | 1 |
| 38 | 1 | 0 | 0 | α | 0 | α | 1 | 0 |
| 39 | 1 | 0 | 0 | α | 0 | α | 1 | 0 |
| 40 | 1 | 0 | 0 | α | 0 | 1 | α | 0 |
| 41 | 1 | 0 | α | 0 | 0 | α | 0 | 1 |
| 42 | 1 | 0 | 0 | α | 0 | α | 1 | 0 |
| 43 | 1 | 0 | 0 | α | 0 | α | 1 | 0 |
| 44 | 1 | 0 | 0 | α | 0 | 1 | α | 0 |
| 45 | 1 | 0 | 0 | α | 0 | α | 1 | 0 |
| 46 | 1 | 0 | 0 | α | 0 | α | 1 | 0 |
| 47 | 1 | 0 | 0 | α | 0 | 1 | α | 0 |

In the enhanced codebook, the triplet is, ($W_{i',2}$, $W_{i'+16,2}$, $W_{i'+32,2}$) where i'=0, 2, ..., 15 corresponds to the original codebook and its linear extensions (e.g., ($W_{0,2}$, $W_{16,2}$, $W_{32,2}$) is one triplet where $W_{16,2}$ and $W_{32,2}$ are linear extensions of $W_{0,2}$).

Similar to the rank-1 case the UE can first choose the best Release 8 precoder within the existing set of 16 rank-2 precoders $W_{i,2}$=, i={0, 1, ..., 15}, and then can determine if this best Release 8 precoder (with codebook index i) can be improved by linear combinations with the unused column vectors (scaled by α) of $W_i$. With this method, the UE may only need to evaluate a total of 18 rank-2 precoders, 16 existing Release 8 rank-2 precoders=, i={0, 1, ..., 15}, and two linear combination rank-2 precoders that depend on the selected $W_{i,2}$.

Simulation Results

An MU-MIMO system simulation with K=10 users, M=4 Tx antennas and N=1 receive antennawas performed. A max-rate scheduler that selects up to M users based on Greedy User Selection (GUS) approach was used.

Figure 6:
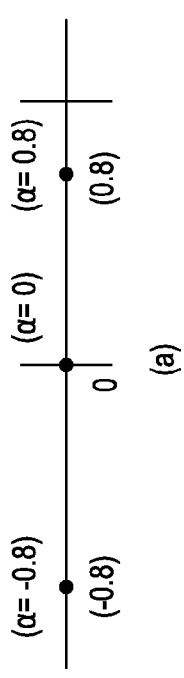
FIG. 6 illustrates various embodiments of finite codebooks for quantized feedback of $\alpha$.
Figure 6:
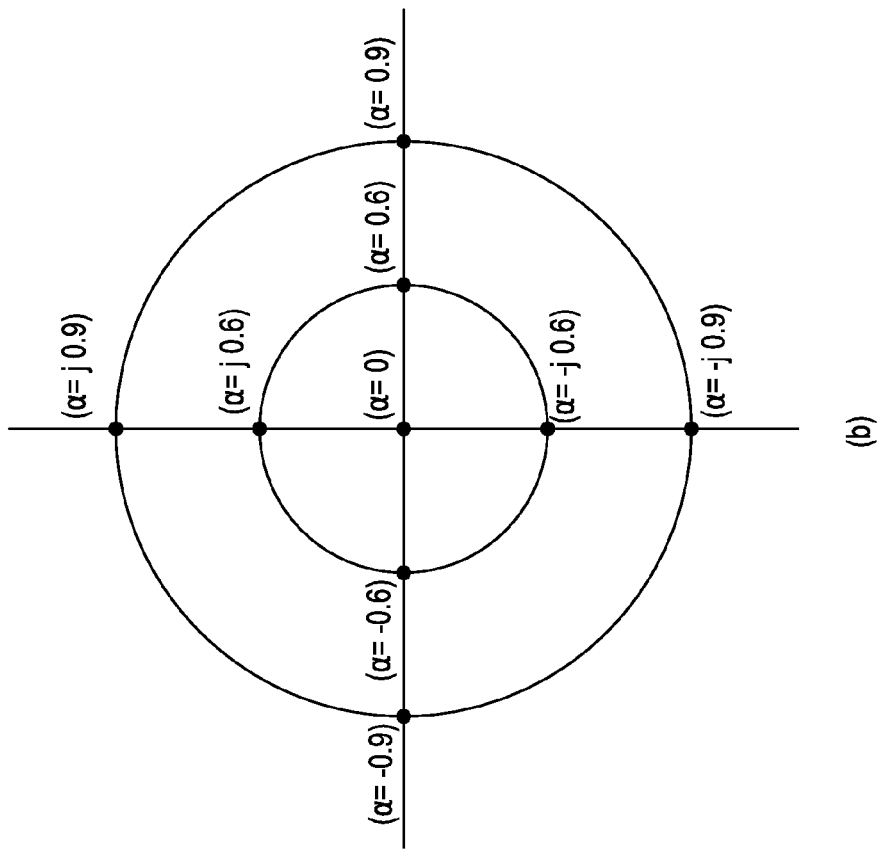
Figure 6:
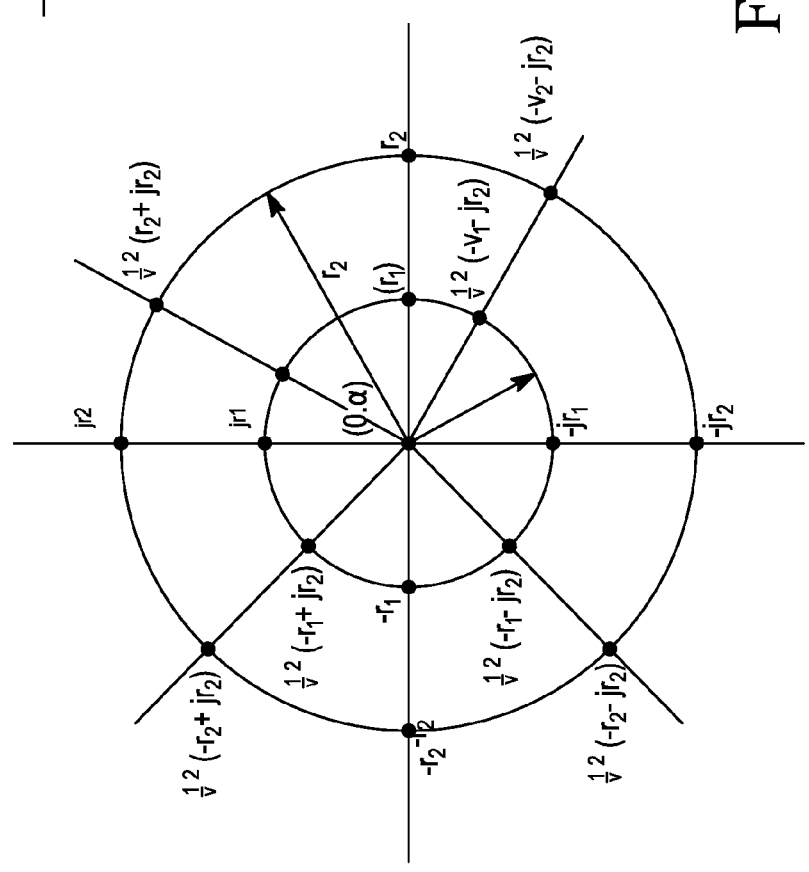

FIG. 6 shows the mean sum rate for the enhanced codebook for different values of α at SNR=20 dB.

Figure 7:
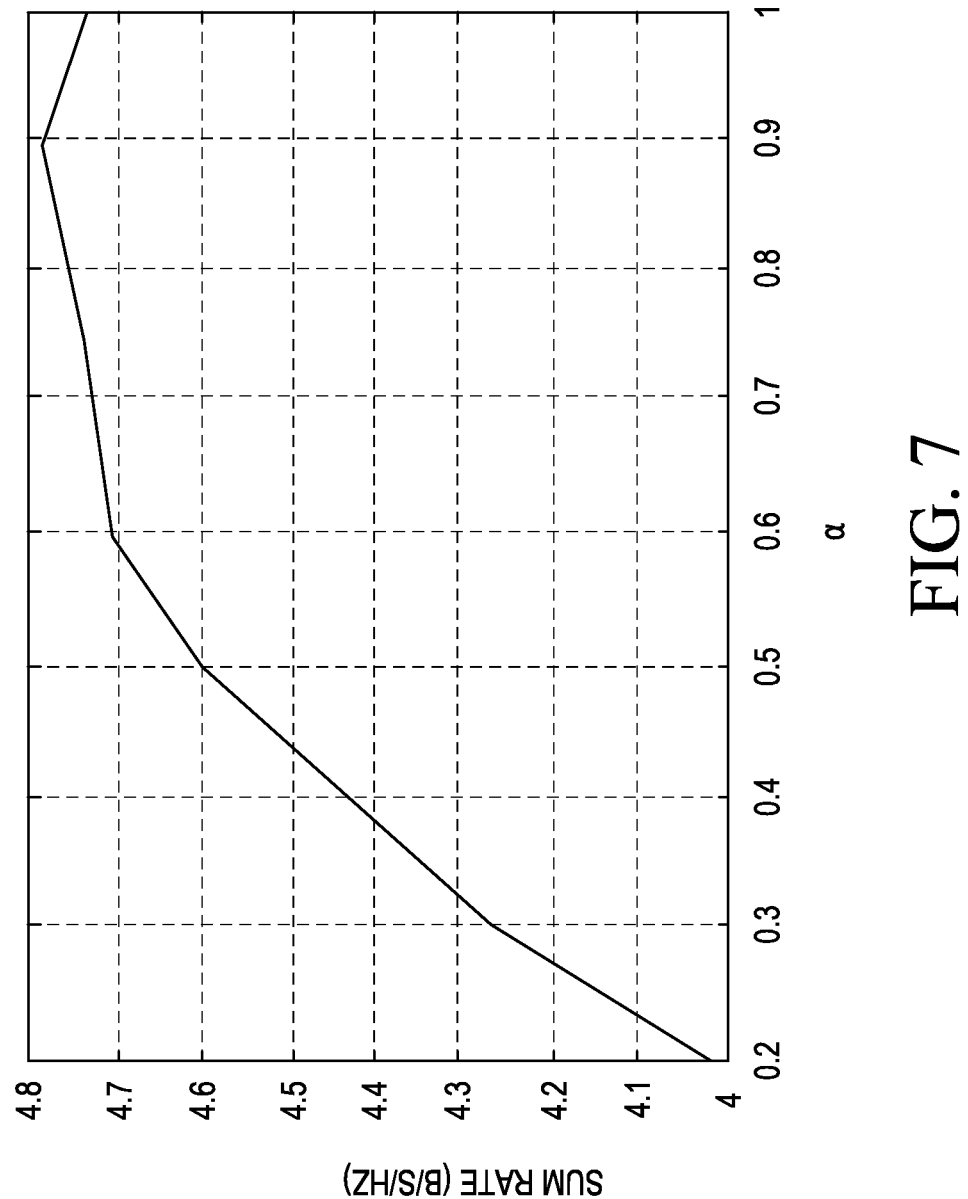
FIGS. 7 and 8 depict test results according to an embodiment.

FIG. 7 shows mean sum rate versus SNR for both the Release 8 codebook and the enhanced 4-Tx codebook with α=0.8. In other words, there is no feedback for α (Approach 2). The codebook enhancement outperforms Release 8 codebook. At 20 dB SNR, the improvement is about 42.8% or 1.43 b/s/Hz.

Figure 8:
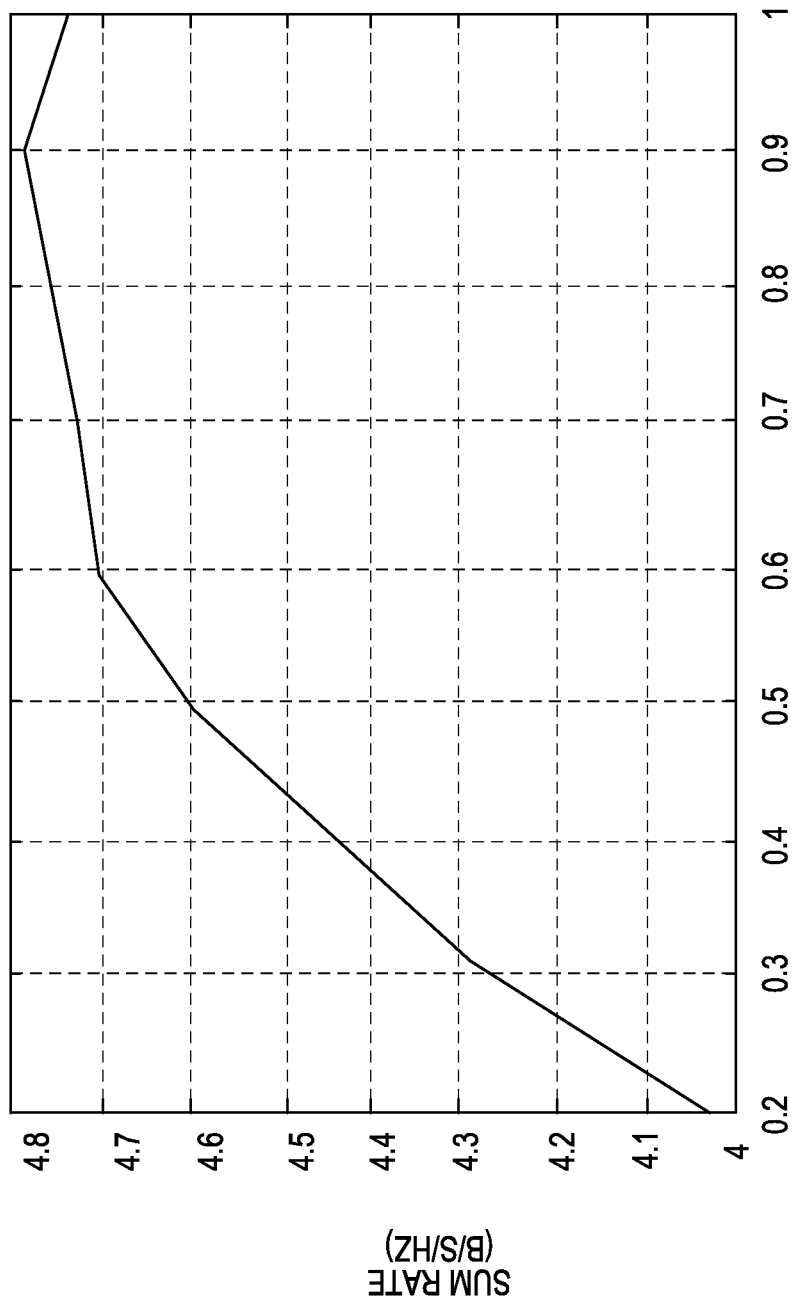

FIG. 8 shows three embodiments where α is quantized to a finite alphabet. In the first embodiment 7(a), α can take on values from the set {-0.8, 0, 0.8}. In the second embodiment 7(b), α can take on values from two 4-PSK consetallations with amplitudes 0.6 and 0.9. In addition to 0, there arethere-fore 8 values that α can take. In the third embodiment 7(c), α can take on values from two 8-PSK constellations with amplitudes $r_1$ and $r_2$.

At least a partial representation of the first component matrix ($V_1$) can be a first index ($i_1$). At least a partial representation of the second component matrix ($V_2$) can be a second index ($i_2$). At least a partial representation of α can be a third index ($i_3$). The first index ($i_1$) and the second index ($i_2$) may be a complete representation of the precoding matrix (U) when α is selected from a set comprising a pre-determined value (e.g., 0.8) and zero. The second index ($i_2$) can be used to indicate the 0-valued state for α.

Alternatively, a single joint index ($j_1$) can be used to represent $V_1$ and $V_2$. In one embodiment, the UE 110 is configured with a CSI process for generating CSI feedback. The CSI process is associated with the generation of one set of CSI which can include PMI, RI, and/or CQI, based on an associated one or more CSI-RS resource(s) (for which the UE assumes non-zero transmission power for the CSI-RS) and one or more interference measurement resource. The PMI may correspond to the first index ($i_1$), the second index ($i_2$), third index ($i_3$) or the joint index ($j_1$). The CSI-RS antenna ports corresponding to the CSI-RS resource(s) is associated to one or more antenna elements of an antenna array. The UE 110 may determine the RI, CQI, the first index ($i_1$), the second index ($i_2$) and third index ($i_3$) based on the CSI-RS received on the CSI-RS antenna ports corresponding to the CSI-RS resource(s) associated with the CSI process. The PMI and thus the first index ($i_1$), the second index ($i_2$) and third index ($i_3$) are conditioned on the most recent RI. The CQI is conditioned on the most recent PMI. The UE 110 may be configured with periodic CSI reporting. The UE may be configured with two reporting instances (first and second reporting instance) each with its own periodicities (first and second periodicity) for reporting on a set of CSI comprising CQI/PMI/RI. The first reporting instance may be in a first uplink subframe and the second reporting instance may be in a second uplink subframe. The first uplink subframe and the second uplink subframe can occur at different times. The first and second periodicities may be different.

In one example, the UE may be configured for wideband CQI/wideband PMI periodic reporting. In one mode of operation, the UE may transmit a first CSI report including RI and a first PMI, the first PMI being a representation of the first index ($i_1$), on the first reporting instances with the first periodicity. The RI and the first PMI may be separately encoded (e.g. mapped to different set of bits in a message) or jointly encoded. In some cases, the first index ($i_3$) may be sub-sampled (i.e., only certain specified values or a subset of the possible values are available to select from) to fit within the available number of bits for the first CSI report. The UE 110 may transmit a second CSI report including the wideband CQI and second PMI, the second PMI being a representation of the second index ($i_2$), on the second reporting instances with the second periodicity. The wideband CQI and the second PMI may be separately or jointly encoded. Alternatively, the UE 110 may transmit a second CSI report including the wideband CQI and second PMI (the second PMI being a representation of the second index ($i_2$)), and third PMI (the third PMI being a representation of the third index ($i_3$)), on the second reporting instances with the second periodicity. The wideband CQI, second PMI and the third PMI may be separately or jointly encoded. In some cases, the first codebook index ($i_1$) and/or the second codebook index ($i_2$) may be sub-sampled (i.e., only certain specified values or a subset of the possible values are available to select from) to fit within the available number of bits for the second CSI report.

In another configured mode of operation, the UE may transmit a first CSI report including RI and a first PMI, the first PMI being a representation of the first index ($i_1$) and the third index ($i_3$), on the first reporting instances with the first periodicity. The RI and the first PMI may be separately encoded (e.g. mapped to different set of bits in a message) or jointly encoded. In some cases, the first index ($i_1$) and/or the third index ($i_3$) may be sub-sampled (i.e., only certain specified values or a subset of the possible values are available to select from) to fit within the available number of bits for the first CSI report. The UE 110 will transmit a second CSI report including the wideband CQI and second PMI, the second PMI being a representation of the second index ($i_2$), on the second reporting instances with the second periodicity. The wideband CQI and the second PMI may be separately or jointly encoded. In some cases, the second index ($i_2$) may be sub-sampled (i.e., only certain specified values or a subset of the possible values are available to select from) to fit within the available number of bits for the second CSI report.

In another mode of operation, the UE may transmit a first CSI report including RI on the first reporting instances with the first periodicity. The UE 110 may transmit a second CSI report including the wideband CQI and PMI, the PMI being a representation of the first index ($i_1$), the second index ($i_2$), and the third index ($i_3$), on the second reporting instances with the second periodicity. The wideband CQI and the PMI may be separately or jointly encoded. In some cases, the first index ($i_1$), the second index ($i_2$), and/or the third index ($i_3$) may be sub-sampled (i.e., only certain specified values or a subset of the possible values are available to select from) to fit within the available number of bits for the second CSI report. In one embodiment, the UE 110 may be signaled an operation mode from a set of modes (including one or more modes described above) by the eNB 120. The different modes can exploit different feedback rates described and tradeoff the subsampling impacts of the codebook index or indices and provide mechanisms to minimize the uplink overhead for CSI feedback.

In another example, the UE may be configured for suband CQI/PMI periodic reporting. In one mode of operation, the UE may determine a Precoder Type Indicator (PTI) and transmit a first CSI report including RI and the PTI on the first reporting instances with the first periodicity. The RI and the PTI may be separately or jointly encoded. The UE 110 uses the PTI to indicate the contents of the CSI reports on the second reporting instances with the second periodicity until the next RI+PTI report. If the most recent transmitted PTI is set to '0' (first state) or '2' (third state), the UE 110 transmits a second CSI report on a subset of the second reporting instances with a third periodicity (e.g., third periodicity=k*second periodicity, k being an integer). If the most recent transmitted PTI is set to '0', the second CSI report includes a first PMI, the first PMI being a representation of the first index ($i_1$).

If the most recent transmitted PTI is set to '2', the second CSI report includes a second PMI, the second PMI being a representation of the third index (i3). Between every two consecutive first/second PMI reports on the second reporting instances with the second periodicity, the UE 110 transmits a third CSI report including a wideband CQI and a third PMI assuming transmission on a wideband channel bandwidth, the third PMI being a representation of the second index (i2). In case of CSI report collision due to the UE configured with multiple carriers (carrier aggregation) or multiple serving cells, the UE transmits a CSI report of only one serving cell with the CSI report including only the representation of the first index (i1) or representation of the third index (i3) have higher priority than other CSI reports including at least CQI which are dropped.

If the most recent transmitted PTI is set to '1' (second state), the UE 110 transmits the second CSI report on a subset of the second reporting instances with a fourth periodicity (e.g., fourth periodicity=m*second periodicity, m being an integer), the second CSI report including the wideband CQI and the third PMI, the third PMI being a representation of the second index (i2) assuming transmission on a wideband channel bandwidth. The fourth periodicity can be different than the third periodicity. Between every two consecutive wideband CQI/wideband third PMI reports on the second reporting instances with the second periodicity, the UE 110 transmits a fourth CSI report including a subband CQI and a fourth PMI assuming transmission on a subband channel bandwidth, the fourth PMI being a representation of the second index (i2). Thus, with the use of PTI, in scenarios where first index (i1) and third index (i3) are not changing, subband feedback of the second index (i2) and associated CQI can be achieved which can improve UE throughput performance.

In an alternate example, if the most recent transmitted PTI is set to '0' (first state) the UE 110 transmits a second CSI report on a subset of the second reporting instances with a third periodicity (e.g., third periodicity=k*second periodicity, k being an integer). The second CSI report includes a first PMI and a second PMI, the first PMI being a representation of the first index (i1), and the second PMI being a representation of the third index (i3). Between every two consecutive first and second PMI reports on the second reporting instances with the second periodicity, the UE 110 transmits a third CSI report including a wideband CQI and a third PMI assuming transmission on a wideband channel, the third PMI being a representation of the second index (i2). The UE 110 behavior if the most recent transmitted PTI is set to '1' (second state), is the same as described in the previous mode of the operation above. In case of CSI report collision due to UE configured with multiple carriers (carrier aggregation) or multiple serving cells, the UE transmits a CSI report of only one serving cell with the CSI report including the representation of the first index (i1) and the representation of the third index (i3) have higher priority that other CSI reports including at least CQI which are dropped.

Figure 9:
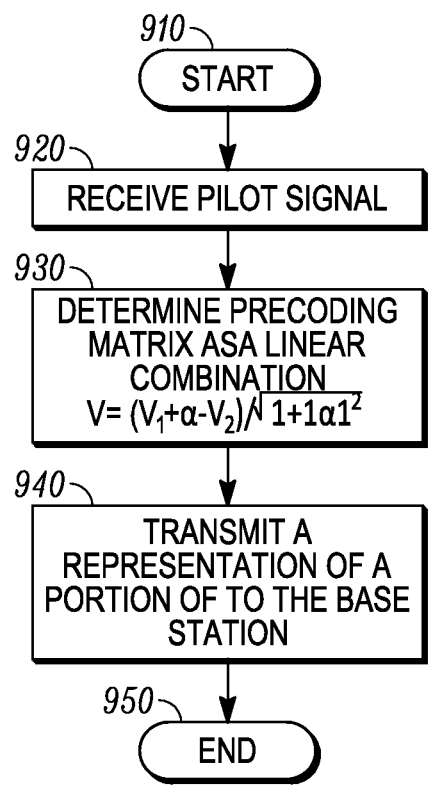
FIG. 9 is a flowchart illustrating the operation of a wireless communication device according to an embodiment.

FIG. 9 is a flowchart illustrating the operation of the UE 110 (FIG. 1) according to an embodiment. At 910, the flowchart begins. At 920, the UE 110 receives a pilot signal such as a CSI-RS (described above) or Cell-specific Reference Signal (CRS) from the eNB 120 (FIG. 1).

At 930, the UE 110 determines the precoding matrix as a linear combination of $u:=(v_1+\alpha v_2)/\sqrt{1+|\alpha|^2}$ as noted above with respect to Equation 5 and the many example implementations following it. The UE 110 can also transmit a first CSI report including at least the representation of at least a portion of the precoding matrix (U) in an uplink subframe. At 940, the UE 110 transmits the representation of at least a portion of the precoding matrix (U) (e.g., as shown in FIG. 8 and the accompanying description) an uplink subframe over one of a Physical Uplink Shared Channel (PUSCH) and a Physical Uplink Control Channel (PUCCH). The UE 110 can also transmit CSI, which can include one or more of V1, V2 and α. At 950, the flowchart ends.

The methods of this disclosure may be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

Although not required, embodiments can be implemented using computer-executable instructions, such as program modules, being executed by an electronic device, such as a general purpose computer. Generally, program modules can include routine programs, objects, components, data structures, and other program modules that perform particular tasks or implement particular abstract data types. The program modules may be software-based and/or may be hardware-based. For example, the program modules may be stored on computer readable storage media, such as hardware discs, flash drives, optical drives, solid state drives, CD-ROM media, thumb drives, and other computer readable storage media that provide non-transitory storage aside from a transitory propagating signal. Moreover, embodiments may be practiced in network computing environments with many types of computer system configurations, including personal computers, hand-held devices, multi-processor systems, microprocessor-based or programmable consumer electronics, network personal computers, minicomputers, mainframe computers, and other computing environments.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the embodiments of the disclosure as set forth herein are intended to be illustrative, not limiting. Various changes may be made without departing from the spirit and scope of the disclosure.

In this disclosure, relational terms such as "first," "second," and the like may be used solely to distinguish one entity or action from another entity or action without necessarily requiring or implying any actual such relationship or order between such entities or actions. The phrase "at least one of" followed by a list is defined to mean at least one of, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method in a wireless terminal comprising:
   receiving a pilot signal from a base station;
   determining a precoding matrix as a linear combination of two matrices $V_1$ and $V_2$; based on the received pilot signal,
   wherein the two matrices of $V_1$ and $V_2$ are sub-matrices of a matrix U of a codebook, the linear combination is $u:=(V_1+\alpha V_2)/\sqrt{(1+|a|^2)}$ and $\alpha$ is one of the real-valued number and a complex-valued number; and
   transmitting a representation of at least a portion of the determined precoding matrix to the base station.

2. The method of claim 1 wherein, $V_1$ and $V_2$ are distinct columns of U.

3. The method of claim 1, wherein $\alpha$ is a predetermined value.

4. The method of claim 1, wherein a column of matrix U is a null vector.

5. The method of claim 1, wherein transmitting the representation of at least a portion of the determined precoding matrix comprises transmitting, by the wireless terminal, a channel state information report.

6. The method of claim 5,
   wherein the channel state information report includes one or more of rank indication and channel quality indication information for one or more spatial layers, and
   wherein the channel quality indication for one or more spatial layers is conditioned on the determined precoding matrix.

7. The method of claim 1, wherein transmitting the representation of at least a portion of the determined precoding matrix compromises:
   transmitting, by the wireless terminal, a first channel state information report including at least a representation of $V_1$ in a first uplink subframe, and a second channel state information report including at least a representation of $V_2$ in a second uplink subframe.

8. The method of claim 7, wherein transmitting the representation of at least a portion of the determined precoding matrix comprises: transmitting, by the wireless terminal, a representation of a in one of the first channel information report or the second channel state information report.

9. The method of claim 7, wherein the first uplink subframe occurs at a different time from the second uplink subframe.

10. The method of claim 7, wherein the first channel state information report and the second channel state information report are transmitted periodically.

11. The method of claim 10, wherein the first and second channel state information reports are transmitted with different periodicities.

12. The method of claim 1, wherein transmitting the representation of at least a portion of the determined precoding matrix comprises:
    transmitting, by the wireless terminal, a representation of $\alpha$.

13. The method of claim 1, wherein transmitting the representation of at least a portion of the determined precoding matrix comprises:
    transmitting, by the wireless terminal, the representation of the precoding matrix over one of a Physical Uplink Shared Channel and a Physical Uplink Control Channel.

14. The method of claim 1, wherein the pilot signal is a channel state information reference signal.

15. The method of claim 14, further comprising receiving a configuration signal indicating one or more of a number of antenna ports, a periodicity and a subframe offset applicable to the channel state information reference signal.

16. The method of claim 1, wherein the pilot signal is a cell-specific reference signal.

17. The method of claim 1, wherein U is a 4×4 unitary matrix obtained from Householder reflection, $U=I-2rr^H$, where r is a unit vector and $r^H$ is the Hermitian-conjugate of r.

18. The method of claim 1 further comprising:
    determining $V_1$ that maximizes a first matrix based on the pilot signal;
    determining $V_2$ based on $V_1$ and the pilot signal.

19. The method of claim 18 wherein determining $V_2$ based on $V_1$ and the pilot signal further comprising selecting $V_2$ from a first set candidates, the set of candidates being determined by $V_1$.

20. A wireless terminal comprising:
    a plurality of antennas configured to receiving a pilot signal from a base station;
    a controller configured to determine a precoding matrix as a linear combination of two matrices $V_1$ and $V_2$; based on the received pilot signal,
    wherein the two matrices $V_1$ and $V_2$ are sub-matrices of a matrix U of a codebook, the linear combination is $u:=(V_1+\alpha V_2)/\sqrt{1+|a|^2}$ and $\alpha$ is one of the real-valued number and a complex-valued number; and
    a transceiver configured to transmit a representation of at least a portion of the determined precoding matrix to the base station.

* * * * *